(12) United States Patent
Kumar

(10) Patent No.: US 10,217,257 B1
(45) Date of Patent: Feb. 26, 2019

(54) PROCESS FOR CONTEXTUALIZING CONTINUOUS IMAGES

(71) Applicant: Amazon Technologies, Inc., Seattle, WA (US)

(72) Inventor: Sudhir Kumar, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 667 days.

(21) Appl. No.: 14/659,981

(22) Filed: Mar. 17, 2015

(51) Int. Cl.
| | |
|---|---|
| G06K 9/36 | (2006.01) |
| H04N 7/18 | (2006.01) |
| G09G 5/00 | (2006.01) |
| G06F 3/048 | (2013.01) |
| G06T 11/60 | (2006.01) |
| G06T 7/00 | (2017.01) |
| G06T 3/20 | (2006.01) |
| G06T 3/40 | (2006.01) |
| G06F 17/21 | (2006.01) |
| G06F 17/30 | (2006.01) |

(52) U.S. Cl.
CPC .......... *G06T 11/60* (2013.01); *G06F 17/211* (2013.01); *G06F 17/3089* (2013.01); *G06T 3/20* (2013.01); *G06T 3/40* (2013.01); *G06T 7/0028* (2013.01); *G06T 7/0085* (2013.01)

(58) Field of Classification Search
USPC ............ 382/284; 348/95; 707/913; 345/619; 715/776
See application file for complete search history.

(56) References Cited

U.S. PATENT DOCUMENTS

| | | | | |
|---|---|---|---|---|
| 6,075,905 | A * | 6/2000 | Herman | G06K 9/32 348/588 |
| 6,381,376 | B1 * | 4/2002 | Toyoda | H04N 1/3876 358/450 |
| 6,535,650 | B1 * | 3/2003 | Poulo | G06T 3/4038 382/284 |
| 6,549,681 | B1 * | 4/2003 | Takiguchi | G06T 3/4038 358/450 |
| 7,010,745 | B1 * | 3/2006 | Shimada | G06T 5/20 382/176 |
| 7,076,116 | B2 * | 7/2006 | Horie | G06T 7/30 358/450 |
| 7,154,515 | B2 * | 12/2006 | Donahue | G06K 15/12 345/686 |
| 7,298,919 | B2 * | 11/2007 | Ejiri | H04N 5/23238 348/94 |
| 7,308,155 | B2 * | 12/2007 | Terada | G06T 9/00 358/450 |

(Continued)

*Primary Examiner* — Kathleen Y Dulaney
(74) *Attorney, Agent, or Firm* — Pierce Atwood LLP

(57) ABSTRACT

Devices, systems and methods are disclosed for determining if an image is displayed using multiple pages of content and loading and displaying the multiple pages in a single context. Bordering pixels may be compared between a first page and a second page to determine if the pixels match above a threshold. If they match above a threshold, the first page and the second page may be aligned, stitched together and displayed in a shared context, allowing a user to pan and zoom between the first page and the second page without interruption, margins, page breaks or the like. The first page and/or the second page may be compared to additional pages of content and each of the additional pages of content is included in the shared context if matching above the threshold.

21 Claims, 25 Drawing Sheets

(56) References Cited

U.S. PATENT DOCUMENTS

| | | | | |
|---|---|---|---|---|
| 7,450,137 B2* | 11/2008 | Deng | G06F 3/1446 | 345/589 |
| 7,702,160 B2* | 4/2010 | Kim | H04N 19/119 | 382/232 |
| 7,768,676 B2* | 8/2010 | Kimura | G06K 9/03 | 345/604 |
| 8,234,277 B2* | 7/2012 | Thong | G06F 17/30011 | 382/181 |
| 8,294,748 B2* | 10/2012 | Stec | G06T 3/4038 | 348/218.1 |
| 8,358,870 B2* | 1/2013 | Abiko | G06K 9/00026 | 382/107 |
| 8,515,176 B1* | 8/2013 | Sankaranarayanan | G06K 9/00463 | 382/185 |
| 8,582,182 B2* | 11/2013 | Zahnert | G06T 1/00 | 345/634 |
| 8,682,103 B2* | 3/2014 | Habuka | H04N 1/3876 | 382/284 |
| 8,699,819 B1* | 4/2014 | Ziegler | G06K 9/6201 | 358/497 |
| 8,774,495 B2* | 7/2014 | Murashita | G06T 11/60 | 356/12 |
| 8,798,366 B1* | 8/2014 | Jones | G06K 9/00483 | 382/177 |
| 8,924,251 B2* | 12/2014 | Ailaney | G06Q 10/10 | 705/14.4 |
| 8,957,944 B2* | 2/2015 | Doepke | H04N 5/23238 | 348/211.4 |
| 9,602,720 B2* | 3/2017 | Okuda | H04N 5/23203 | |
| 2001/0019636 A1* | 9/2001 | Slatter | G06K 9/20 | 382/284 |
| 2003/0123714 A1* | 7/2003 | O'Gorman | G06K 9/00026 | 382/124 |
| 2004/0047510 A1* | 3/2004 | Kawabata | G06F 3/14 | 382/232 |
| 2004/0169870 A1* | 9/2004 | Ahmed | G06T 3/00 | 358/1.8 |
| 2006/0045388 A1* | 3/2006 | Zeineh | G02B 21/365 | 382/312 |
| 2006/0133699 A1* | 6/2006 | Widrow | G06F 17/30247 | 382/305 |
| 2007/0150443 A1* | 6/2007 | Bergholz | G06F 17/30569 | |
| 2007/0237428 A1* | 10/2007 | Goodwin | G06K 9/00442 | 382/309 |
| 2008/0043259 A1* | 2/2008 | Triplett | H04N 1/3873 | 358/1.9 |
| 2008/0077570 A1* | 3/2008 | Tang | G06F 17/30684 | |
| 2008/0114757 A1* | 5/2008 | Dejean | G06F 17/30569 | |
| 2009/0241054 A1* | 9/2009 | Hendricks | G06F 17/3089 | 715/776 |
| 2012/0134590 A1* | 5/2012 | Petrou | G06F 17/30253 | 382/182 |
| 2013/0142450 A1* | 6/2013 | Doyle | H04N 1/40062 | 382/275 |
| 2013/0145307 A1* | 6/2013 | Kawasaki | G06F 3/04886 | 715/781 |
| 2014/0111516 A1* | 4/2014 | Hall | G06T 11/60 | 345/428 |
| 2016/0034757 A1* | 2/2016 | Chhichhia | G06K 9/00469 | 382/206 |

* cited by examiner

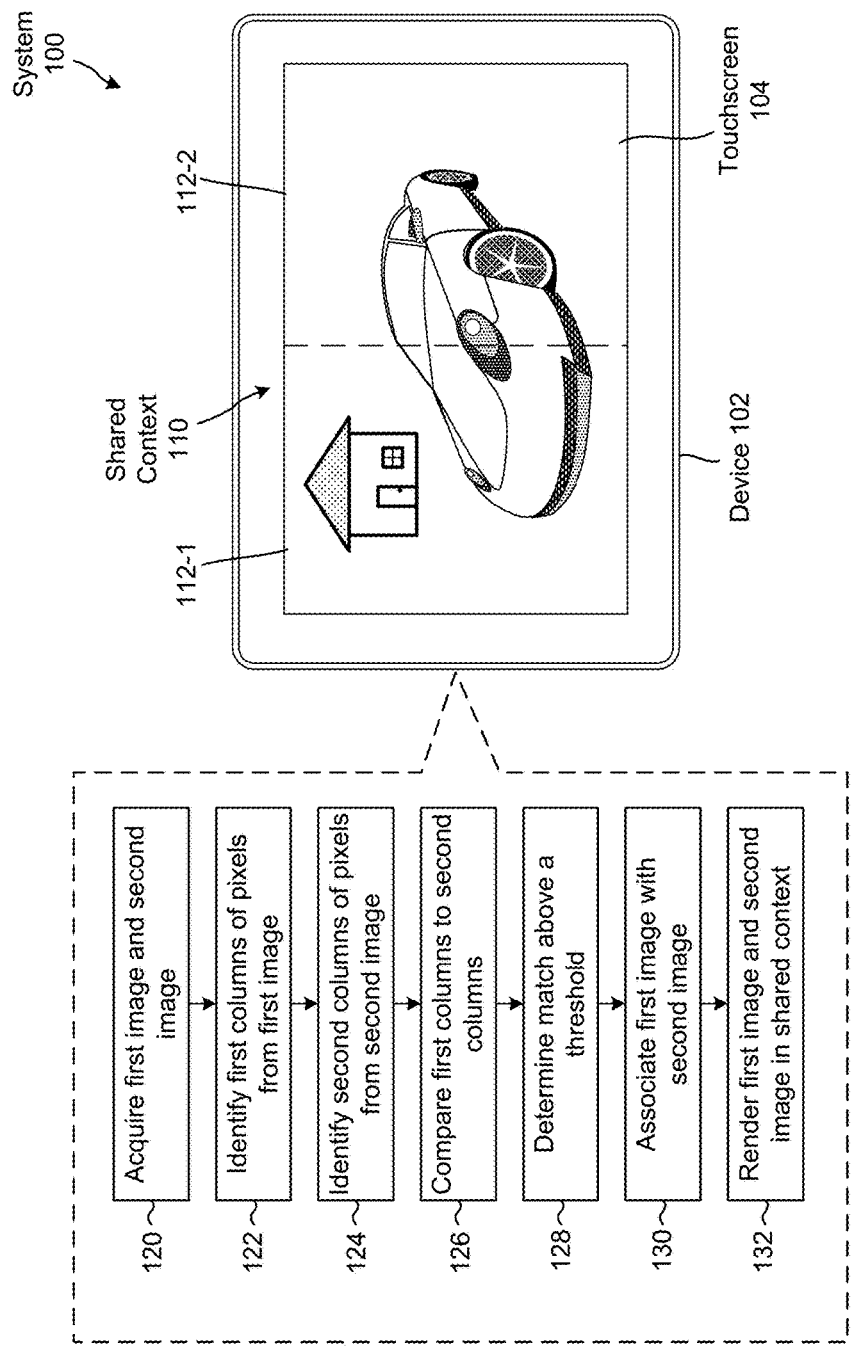

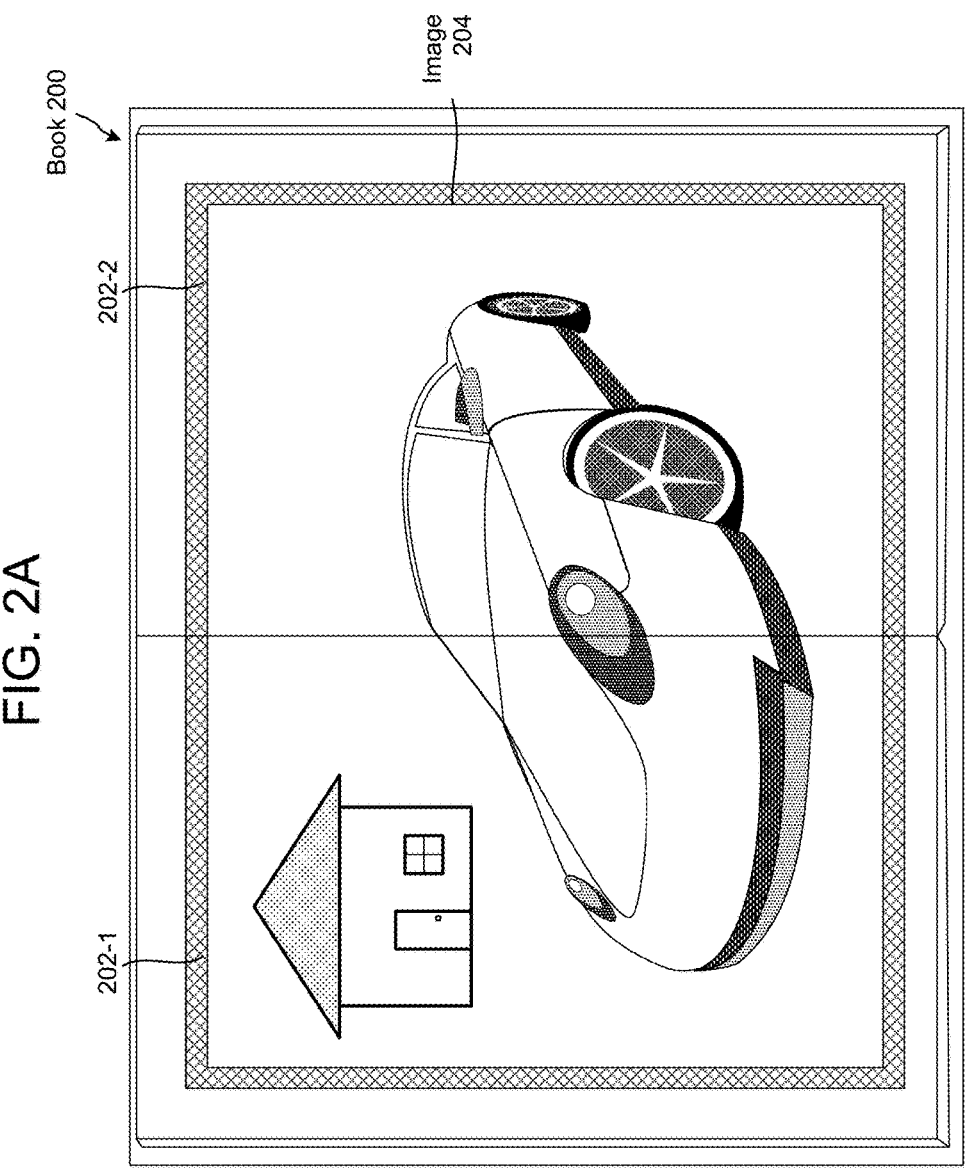

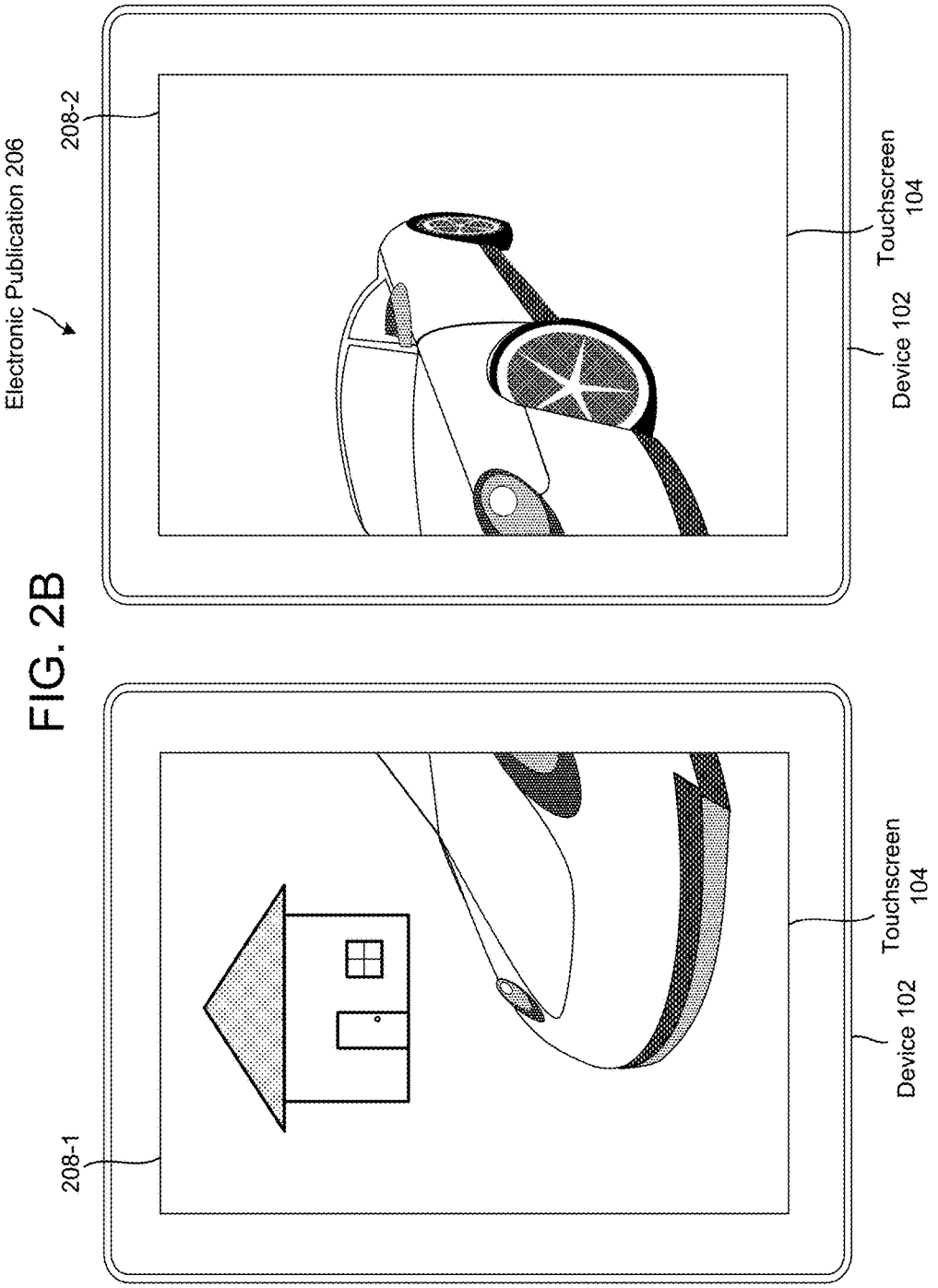

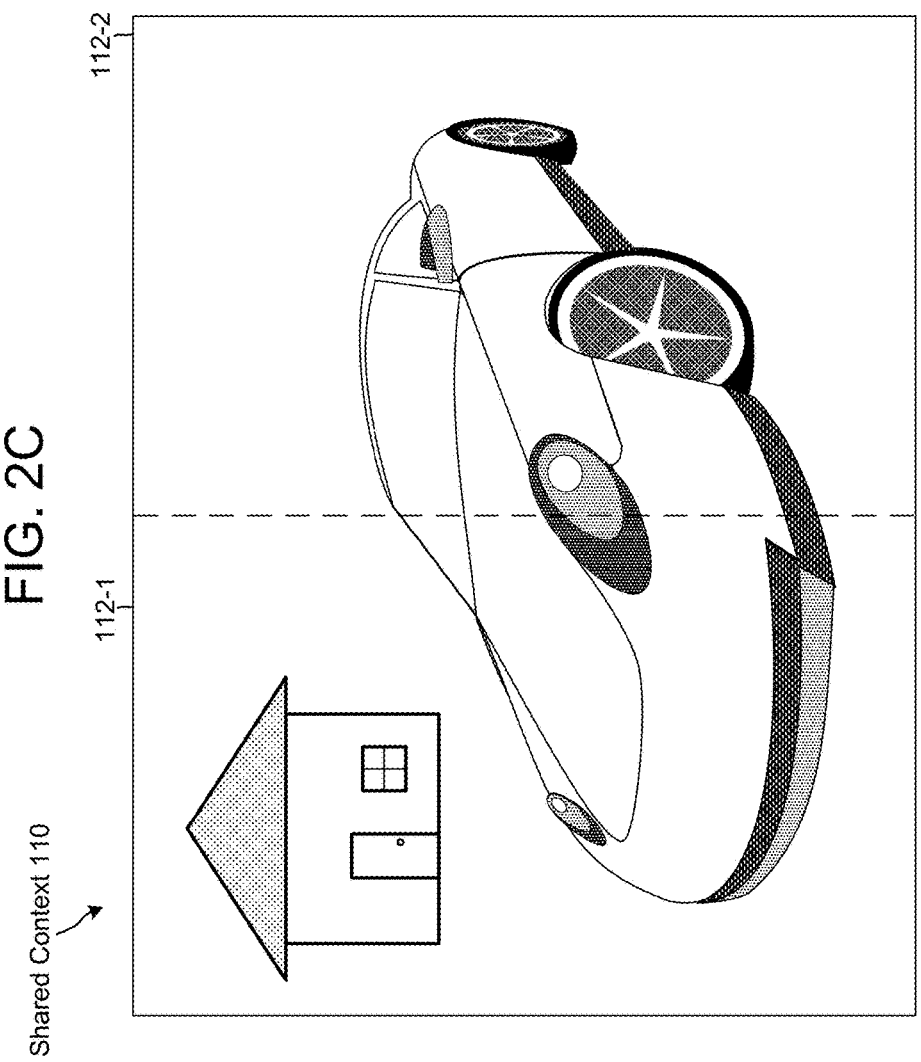

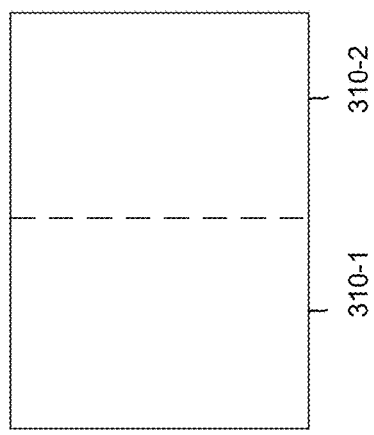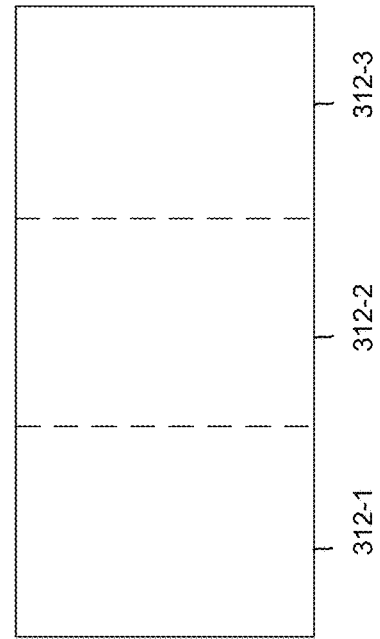

410-1    410-2

412-1    412-2

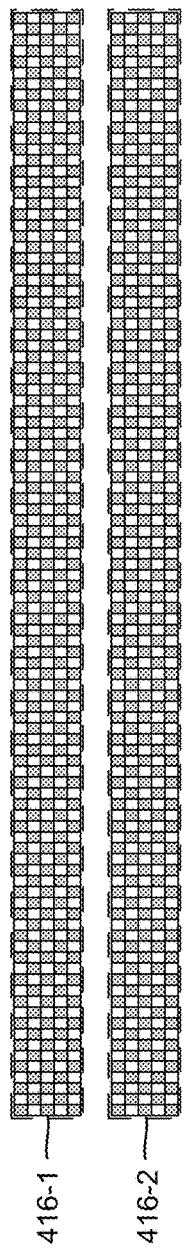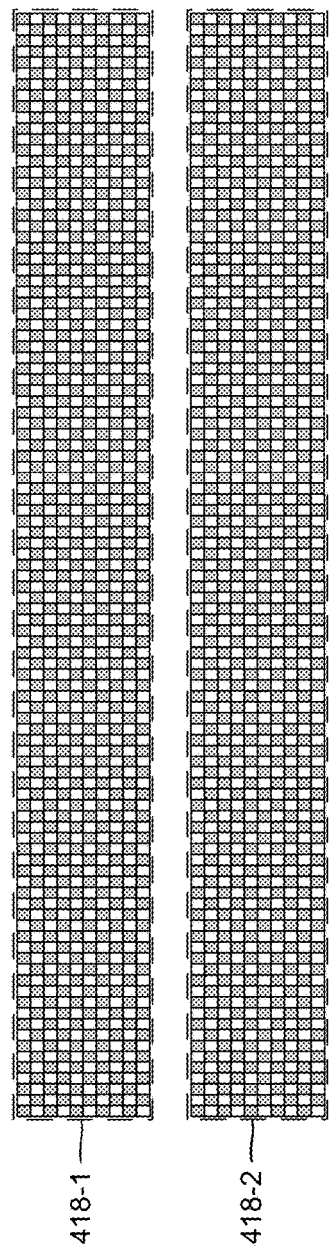

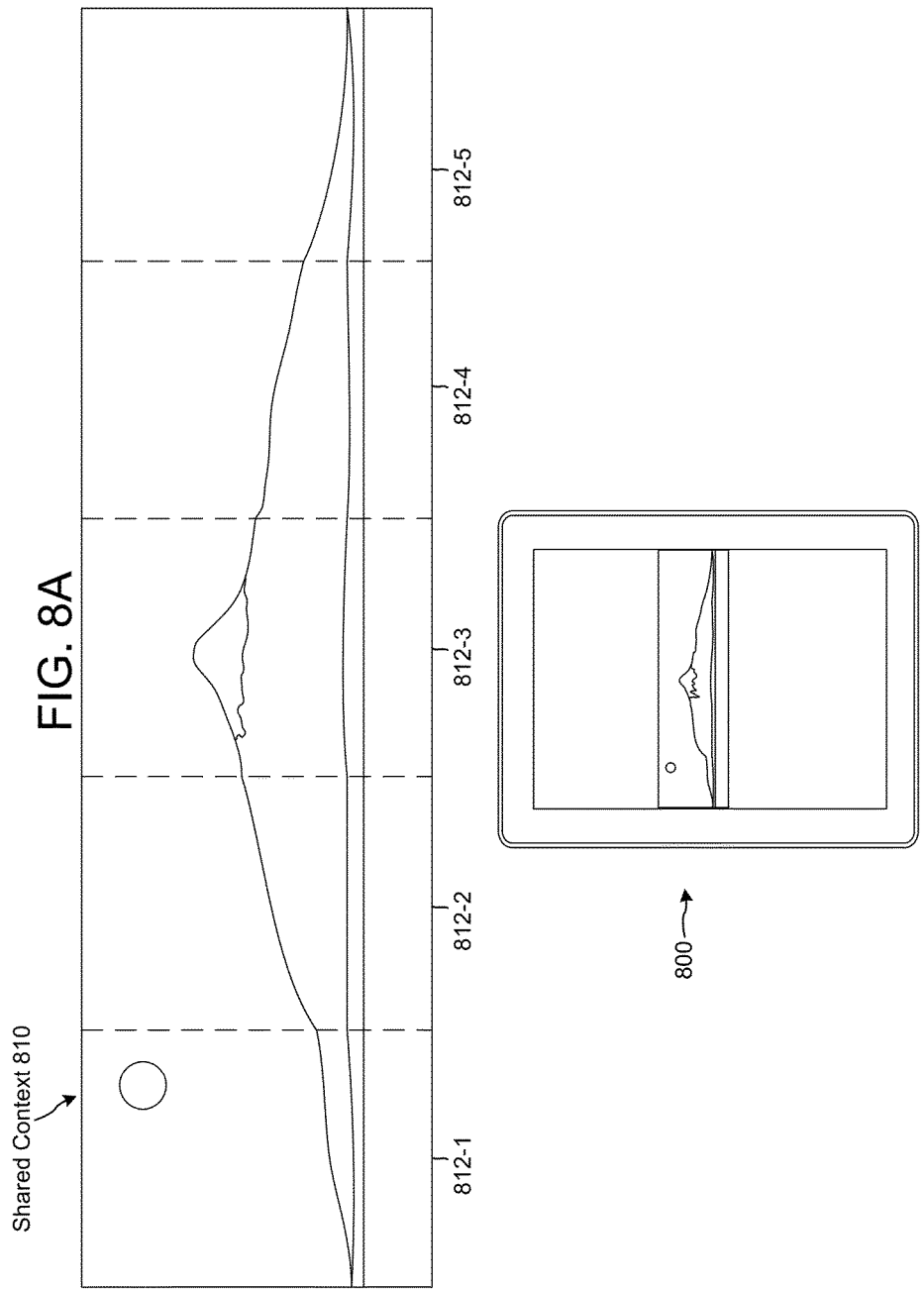

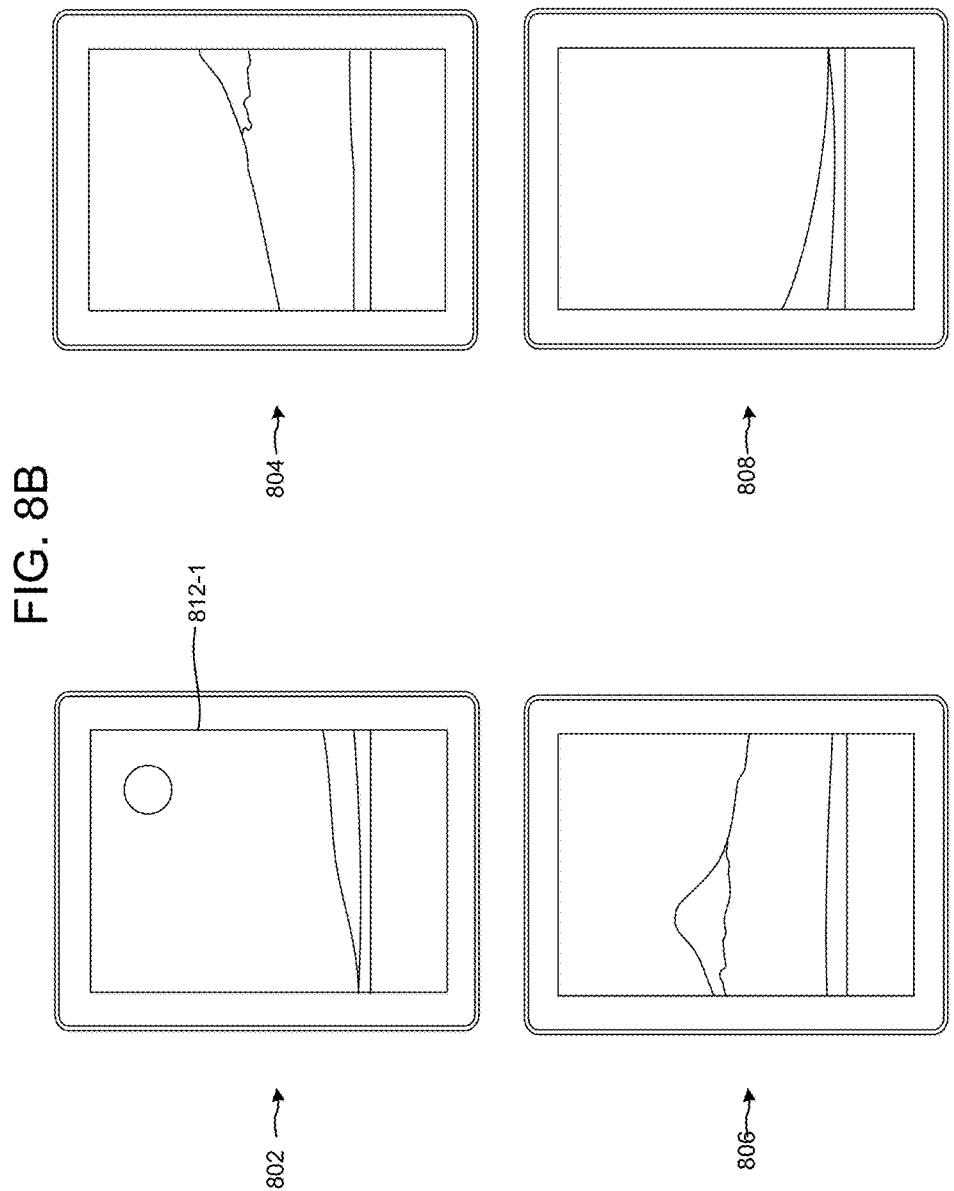

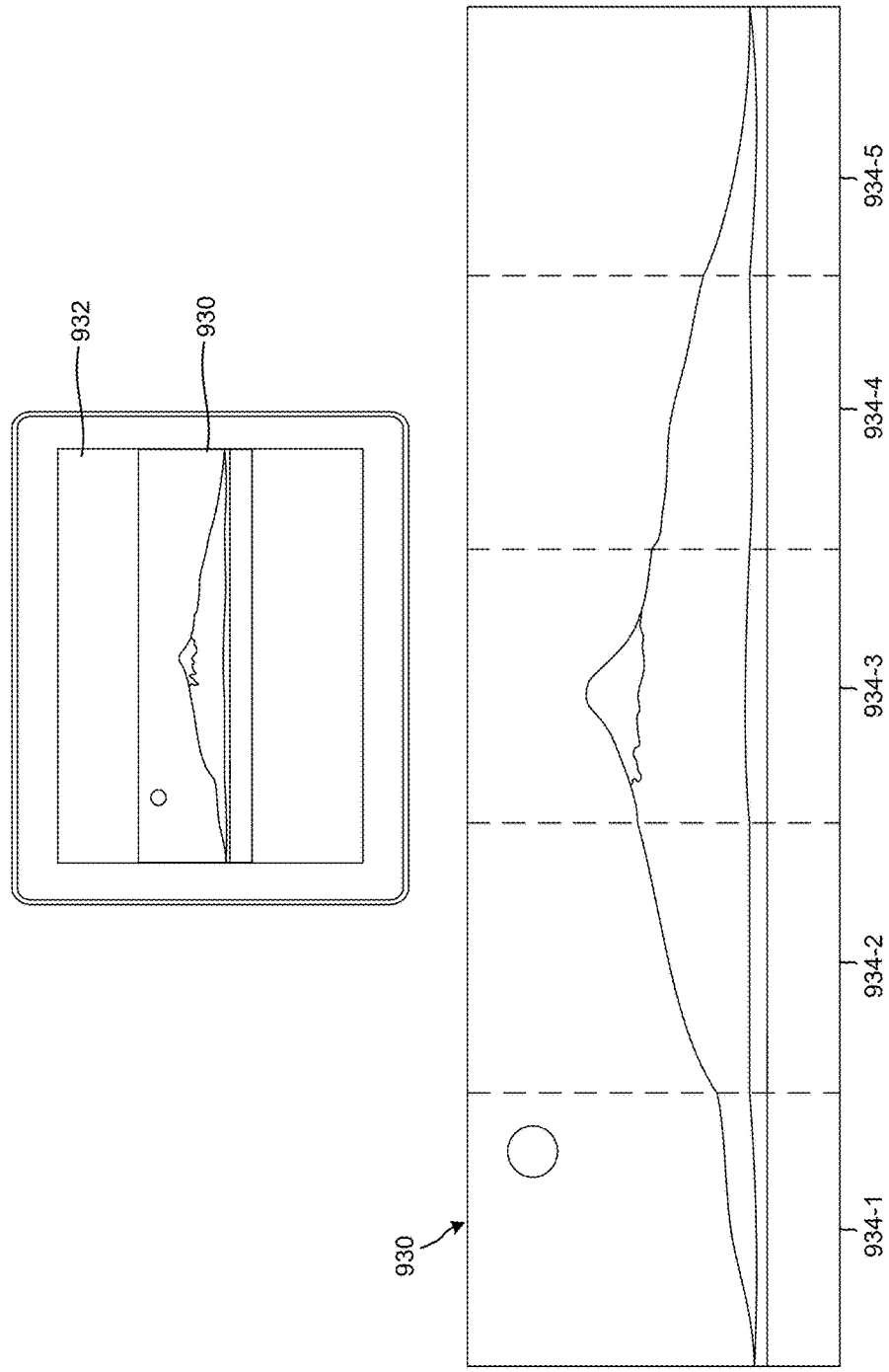

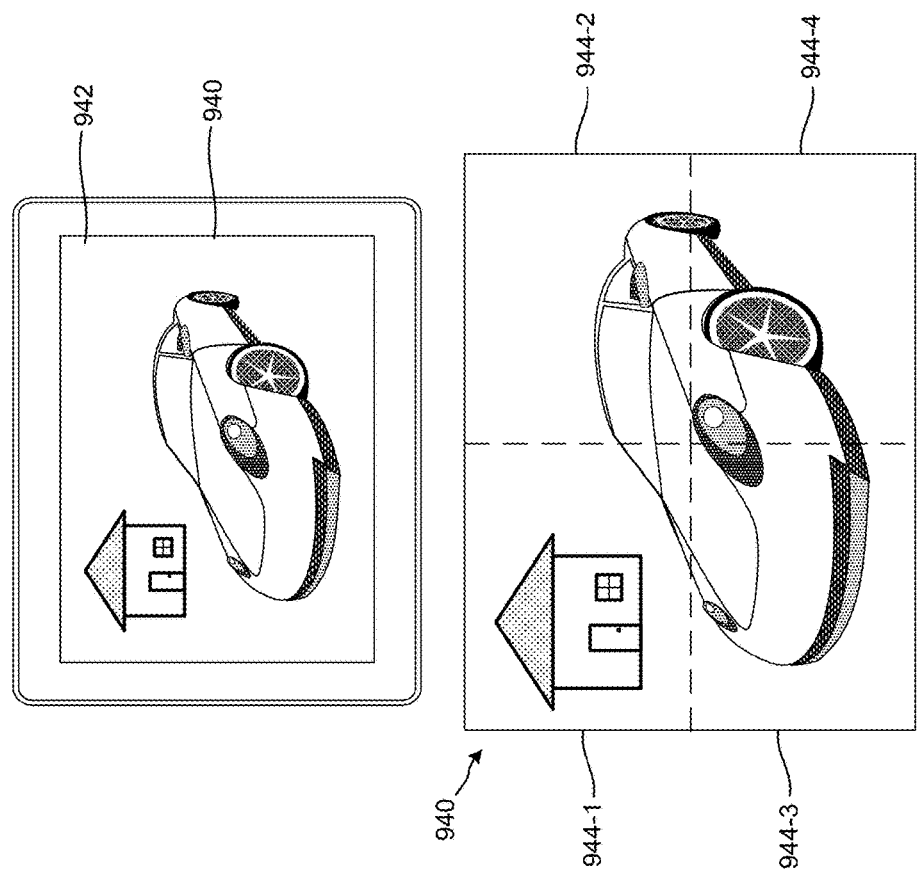

PROCESS FOR CONTEXTUALIZING CONTINUOUS IMAGES

BACKGROUND

With the advancement of technology, the use and popularity of electronic devices, such as mobile devices, has increased considerably. Mobile devices, such as smart phones, electronic readers and tablet computers, typically display content including images.

BRIEF DESCRIPTION OF DRAWINGS

For a more complete understanding of the present disclosure, reference is now made to the following description taken in conjunction with the accompanying drawings.

FIG. 1 illustrates an overview of a system for implementing embodiments of the present disclosure.

FIGS. 2A-2E illustrate examples of viewing content in different contexts, including associating continuous images in a single context according to embodiments of the present disclosure.

FIGS. 3A-3D illustrate examples of layouts for images associated in a single context according to embodiments of the present disclosure.

FIGS. 4A-4F illustrate examples of comparison regions used to determine if images are continuous according to embodiments of the present disclosure.

FIGS. 8A-8B illustrate examples of viewing multiple images associated in a single context according to embodiments of the present disclosure.

FIGS. 9B-9C illustrate associated images according to embodiments of the present disclosure.

DETAILED DESCRIPTION

Figure 2D:
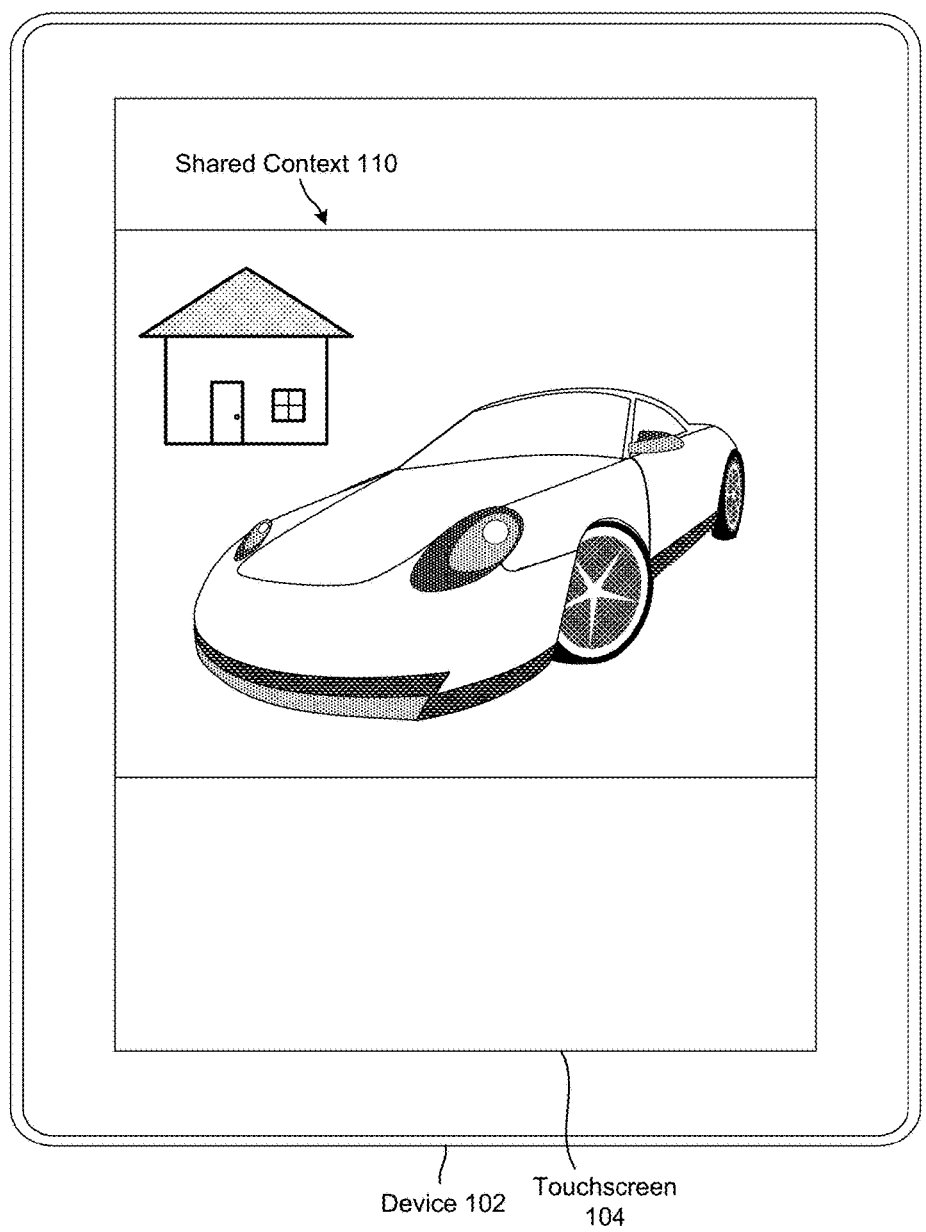

An electronic device may display content as a series of pages of content, each page including text, images, a combination of text and images or the like. While a layout of the content may be fixed or variable, a continuous image may extend across multiple pages of content. For example, a typical left-right page spread may use both a left page and a right page to display a single image, such as in graphic novels, comic books or the like. As another example, a multi-page spread may be used to display a panorama-type image or may unfold to display a grid of images, useful for maps or other large images including fine details. While printed publications may be designed to efficiently display these multi-page spreads as a single image, for example using larger sheets of fold-out paper or the like, electronic devices may typically display each page separately. Thus, when viewing the multi-page spread on an electronic device, a user typically only views a single page at a time. When zooming in, or otherwise manipulating the image of the page, the user typically may zoom and pan within borders of the left page or the right page, but cannot view portions of the left page and the right page simultaneously. Instead, panning from the left page to the right page results in an interruption and/or a disjointed view as the display jumps between the left page and the right page.

To address these issues, devices, systems and methods are disclosed that determine that a continuous image extends between multiple pages of content and associates the multiple pages of content in a shared context. Using the shared context, the multiple pages of content may be aligned and stitched together, without borders or margins, to display the continuous image as a whole. Thus, when viewing a multi-page spread on an electronic device, the user may view one or more of the multiple pages simultaneously. For example, the user may associate the multiple pages in a shared context and may display the entire shared context to view the continuous image in its entirety, or may zoom and pan within borders of the continuous image, displaying portions of multiple pages. Thus, panning from the left page to the right page may display the transition between the left page and the right page in context, resulting in a continuous view and improved user experience. Each page of the multi-page spread may be associated during rendering of the content, without any associations embedded in the content when received from a publisher, etc.

FIG. 1 illustrates an overview of a system 100 for implementing embodiments of the disclosure. The system includes a computing device 102 having a display 104, which may be a touchscreen. The touchscreen 104 is a display capable of receiving input via contact between an object (such as a finger, stylus, etc.) and the screen, although the disclosure is not limited thereto. As shown in FIG. 1, the display 104 may display a shared context 110 including a first image 112-1 and a second image 112-2.

The device 102 may display a graphical comic book, which may have continuous images stretched across two or more pages. However, each page of the graphical comic book may be stored as a separate image. To determine that multiple images are part of a continuous image and to associate the multiple images in a single context, the device 102 may acquire (120) a first image and a second image, such as the first image 112-1 and the second image 112-2. The device 102 may identify (122) first columns of pixels from the first image and identify (124) second columns of pixels from the second image. For example, in a left-right page spread, the device 102 may identify the first columns as columns of pixels furthest to the right of the first image and identify the second columns as columns of pixels furthest to the left of the second image. Thus, the first columns and the second columns would include contiguous pixels if the first image and the second image form a continuous image. To determine if the first image and the second image form a continuous image, the device 102 may compare (126) the first columns to the second columns to determine a likelihood of the first columns and the second columns being contiguous. For example, the device 102 may compare pixel values between the first columns and the second columns, average pixel values between corresponding rows in the first columns and the second columns, identify continuous edges or other patterns between the first columns and the second columns or use other image matching techniques known to one of skill in the art.

After comparing the first columns to the second columns, the device 102 may determine (128) that the first columns and the second columns match above a threshold. The threshold may be a confidence score, a number of errors or inconsistencies, or other factors used to compare images, and may be stored and/or modified as a setting of the device 102. For example, a higher threshold may decrease a likelihood of false associations but also decrease a convenience to the user as related images may not be associated by the device 102, whereas a lower threshold may increase a likelihood of false associations but also increase a convenience to the user as related images may be associated by the device 102. After determining that the first columns and the second columns match above the threshold, the device 102 may associated (130) the first image with the second image and may render (132) the first image and the second image in one context. For example, the device 102 may align and stitch the first image with the second image, excluding page margins and other non-image content, and may display the first image, the second image and/or portions of the first image and the second image, allowing a user of the device 102 to pan between the first image and the second image without interruption.

By way of background, in a printed publication (e.g., a book, comic book, manga, graphic novel, magazine, fashion magazine, printed map(s) or the like), multiple pages may be associated with each other to form a continuous image. As illustrated in FIG. 2A, for example, a book 200 may include a first page 202-1 and a second page 202-2 that combine to form an image 204. In this example, the first page 202-1 displays a left portion of the image 204 while the second page 202-2 displays a right portion of the image 204. While a left-right page spread is common, a single image may also be depicted over multiple page spreads or using a fold-out spread.

When the book 200 is published electronically, each page 202 of the book 200 is generally scanned individually to generate an image and the image is displayed individually. For example, FIG. 2B illustrates the book 200 converted to an electronic publication 206, with the left portion of the image 204 displayed as a first image 208-1 and the right portion of the image 204 displayed as a second image 208-2. While viewing the electronic publication 206, the device 102 may display the first image 208-1 or separately display the second image 208-2. If a magnification of the first image 208-1 is increased, a user of the device 102 may zoom and pan through the first image 208-1 until reaching an edge of the first image 208-1. Subsequent panning may result in an animation indicating that the edge of the first image 208-1 has been reached or may result in advancing within the electronic publication 206 and displaying only the second image 208-2.

While the electronic publication 206 is described as being generated from the book 200, the disclosure is not limited thereto. Instead, electronic publications (e.g., a book, comic book, manga, graphic novel, magazine, fashion magazine, printed map(s) or the like in an electronic format) may be created using any method known to one of skill in the art, and may include layouts similar to printed publications or may include new layouts not present in printed publications. Therefore, FIGS. 2A-2B are intended to illustrate a single example of how a continuous image may lack context in an electronic publication without limiting the present disclosure.

Figure 2E:
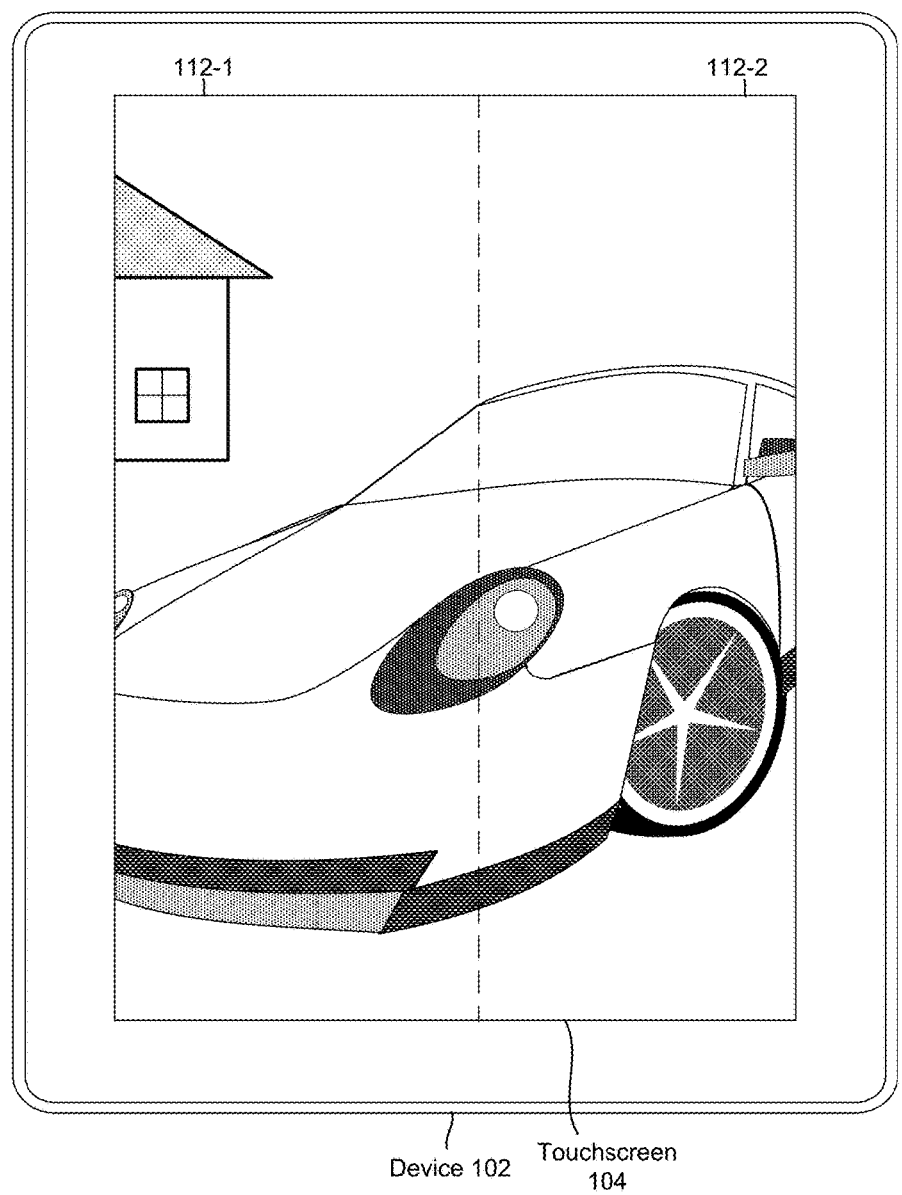

To provide the user with a better user experience, the device 102 may determine that multiple images are part of a continuous image and may associate the multiple images in a single context. While the single context includes the multiple images, the device 102 may display only a portion of the single context, such as an individual image of the multiple images. In addition, however, the device 102 may pan between the multiple images or display the multiple images in their entirety. For example, as illustrated in FIG. 2C, the device 102 may determine that the first image 112-1 and the second image 112-2 are part of a continuous image and may associate the first image 112-1 and the second image 112-2 in the shared context 110. As a result, the device 102 may display the shared context 110 as a whole, as illustrated in FIG. 2D, or may display portions of the first image 112-1 and the second image 112-2, as illustrated in FIG. 2E, for example as part of zoom and/or pan function. The user of the device 102 may pan through the first image 112-1 until reaching an edge of the first image 112-1, at which point additional panning displays portions of the second image 112-2 in addition to portions of the first image 112-1. Therefore, the user may pan through the first image 112-1 and the second image 112-2 until reaching an edge of the second image 112-2. If the second image 112-2 is not associated with a subsequent image, subsequent panning may result in an animation indicating that the edge of the second image 112-2 has been reached or may result in advancing within the electronic publication 206 and displaying the subsequent image. Although FIG. 2C shows a dashed border to illustrate a boundary between first image 112-1 and second image 112-2, while being shown on the display, the first image and second image may be displayed together without a visible boundary or border, thus appearing together as if they were a single, navigable image.

FIG. 3A illustrates an example of a left-right page spread forming a continuous image using a first image 310-1 and a second image 310-2. In this example the device 102 may associate the first image 310-1 with the second image 310-2 by comparing first columns of pixels in the first image 310-1 with adjoining second columns of pixels in the second image 310-2, as described in greater detail above with regard to FIG. 1. In this example, the shared context forms a continuous image as the first image 310-1 and the second image 310-2 are contiguous in a horizontal orientation.

FIG. 3B illustrates a multi-page spread forming a continuous image using a first image 312-1, a second image 312-2 and a third image 312-3. The device 102 may associate the first image 312-1 with the second image 312-2 and associate the second image 312-2 with the third image 312-3 by comparing columns of pixels as described in greater detail above with regard to FIG. 1. For example, the device 102 may identify first columns of pixels from the first image 312-1 (e.g., columns of pixels along a right-hand side of the first image 312-1), identify second columns of pixels from the second image 312-2 (e.g., columns of pixels along a left-hand side of the second image 312-2) and determine that the first columns match the second columns above a threshold. Similarly, the device 102 may identify third columns of pixels from the second image 312-2 (e.g., columns of pixels along a right-hand side of the second image 312-2), identify fourth columns of pixels from the third image 312-3 (e.g., columns of pixels along a left-hand side of the third image 312-3) and determine that the third columns match the fourth columns above the threshold.

The device 102 may therefore associate the first image 312-1, the second image 312-2 and the third image 312-3 as a continuous image and part of a single shared context. In this example, the shared context forms a continuous image in a horizontal orientation, as the first image 312-1 is contiguous to the second image 312-2 and the second image 312-2 is contiguous to the third image 312-3. Thus, the first image 312-1 is associated with the third image 312-3 despite the first image 312-1 not being contiguous with the third image 312-3. While FIG. 3B illustrates the shared context including three images in a horizontal orientation, the disclosure is not limited thereto and the shared context may include any number of images in a horizontal orientation, or in other shapes of configurations as described below.

As illustrated in FIGS. 1 and 3A-3B, the device 102 may associate continuous images in a horizontal orientation by comparing columns of pixels. However, the disclosure is not limited thereto and the device may associate continuous images in a vertical orientation by comparing rows of pixels without departing from the disclosure. For example, FIG. 3C illustrates a multi-page spread forming a continuous image using a first image 314-1, a second image 314-2 and a third image 314-3. The device 102 may associate the first image 314-1 with the second image 314-2 and associate the second image 314-2 with the third image 314-3 by comparing rows of pixels. For example, the device 102 may identify first rows of pixels from the first image 314-1 (e.g., rows of pixels along a bottom of the first image 314-1), identify second rows of pixels from the second image 314-2 (e.g., rows of pixels along a top of the second image 314-2) and determine that the first rows match the second rows above a threshold. Similarly, the device 102 may identify third rows of pixels from the second image 314-2 (e.g., rows of pixels along a bottom of the second image 314-2), identify fourth rows of pixels from the third image 314-3 (e.g., rows of pixels along a top of the third image 314-3) and determine that the third rows match the fourth rows above the threshold.

The device 102 may therefore associate the first image 314-1, the second image 314-2 and the third image 314-3 as a continuous image and part of a single shared context. In this example, the shared context forms a continuous image in a vertical orientation, as the first image 314-1 is contiguous to the second image 314-2 and the second image 314-2 is contiguous to the third image 314-3. Thus, the first image 314-1 is associated with the third image 314-3 despite the first image 314-1 not being contiguous with the third image 314-3. While FIG. 3C illustrates the shared context including three images in a vertical orientation, the disclosure is not limited thereto and the shared context may include any number of images in a vertical orientation.

The device 102 may also associate continuous images in both a horizontal orientation and a vertical orientation to form a grid of images included in a shared context. As an example, to associate the images included in the grid the device 102 may start with a first image and associate contiguous images in a horizontal orientation until reaching an end of a first row of images, which occurs when an image at the end of the first row does not match a subsequent image. At this point, the device 102 may determine if the first image matches the subsequent image in a vertical orientation. If the first image matches the subsequent image, the device 102 may determine that the subsequent image begins a second row and may associate contiguous images in a horizontal orientation until reaching an end of the second row of images. The device 102 may continue associating images within the grid until a vertical association is below the threshold, indicating that there are no additional rows. The device 102 may then associate each of the images included in the multiple rows of images as a shared context.

Figure 3D:
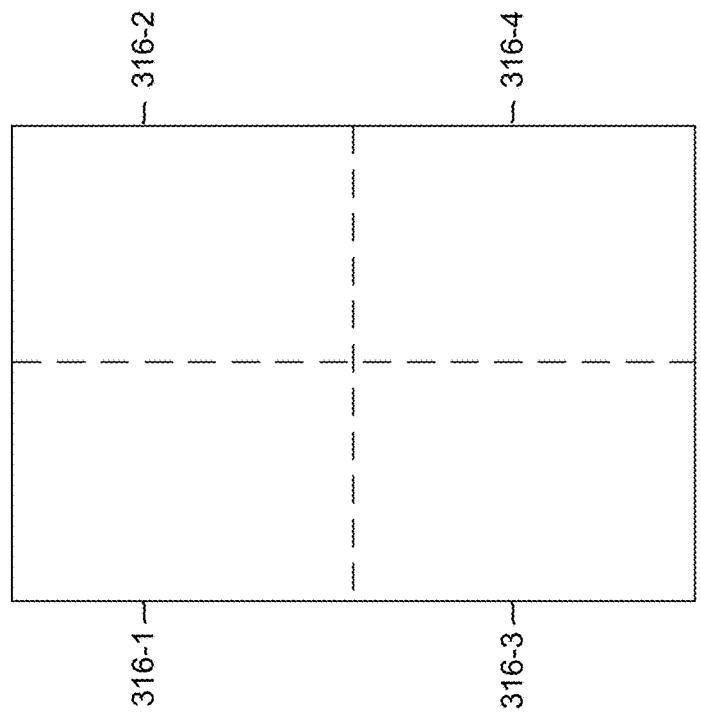
Figure 3C:
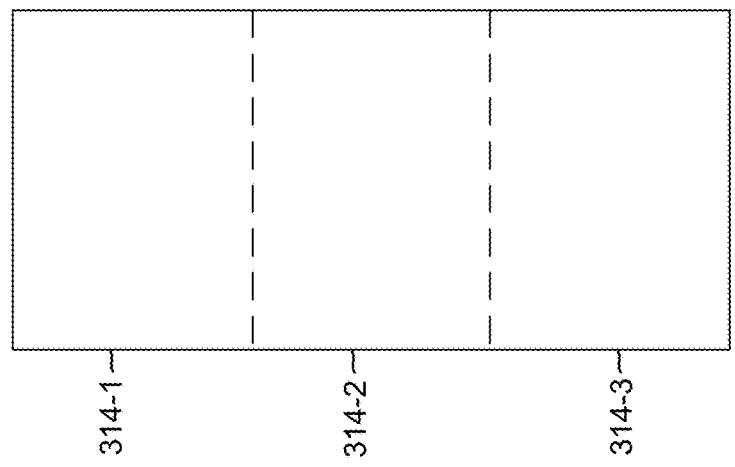

For example, FIG. 3D illustrates a grid forming a continuous image using a first image 316-1, a second image 316-2, a third image 316-3 and a fourth image 316-4. To associate the images included in the grid, the device 102 may compare columns of pixels between the first image 316-1 and the second image 316-2 and associate the first image 316-1 with the second image 316-2 in a horizontal orientation. However, the device 102 may compare columns of pixels between the second image 316-2 and the third image 316-3 and determine that the second image 316-2 and the third image 316-3 are not associated in a horizontal orientation. The device 102 may then compare rows of pixels between the first image 316-1 (as beginning of the first row) and the third image 316-3 and associate the first image 316-1 with the third image 316-3 in a vertical orientation. The device 102 may then compare columns of pixels between the third image 316-3 and the fourth image 316-4 and associate the third image 316-3 and the fourth image 316-4 in a horizontal orientation. To determine that the grid has ended, the device 102 may compare columns of pixels between the fourth image 316-4 and a subsequent image (not illustrated) and determine that the fourth image 316-4 and the subsequent image are not associated in a horizontal orientation. The device 102 may then compare rows of pixels between the third image 316-3 (as beginning of the second row) and the subsequent image and determine that the third image 316-3 and the subsequent image are not associated in a vertical orientation.

The device 102 may therefore associate the first image 316-1, the second image 316-2, the third image 316-3 and the fourth image 316-4 as a continuous image and part of a single shared context. Thus, the first image 316-1 is associated with the fourth image 316-4 despite the first image 316-1 not being contiguous with the fourth image 316-4. While FIG. 3D illustrates the shared context including four images in a grid, the disclosure is not limited thereto and the shared context may include any number of images in a grid.

Certain images stored in a digital format may inherently have a fixed layout, such that a top of an image is a top of the image regardless of viewing position, viewing angle, screen orientation etc. Thus, a first row (top row) is associated with a top of the image and a last row (bottom row) is associated with a bottom of the image, regardless of viewing angle. Similarly, a first column (left column) is associated with a left-most edge of the image and a last column (right column) is associated with a right-most edge of the image. While image editing programs may digitally manipulate images, such as changing an orientation or layout of the images, the present disclosure describes rows and columns such that a row refers to a series of adjacent pixels that appear horizontally in an image and a column refers to a series of adjacent pixels that appear vertically in an image, such as may be found using a fixed or absolute layout.

As described above, the device 102 may form rows of contiguous images and associate the rows in a vertical direction by comparing images at the beginning of each row. However, the disclosure is not limited thereto and the device 102 may also compare additional images in a vertical orientation. For example, the device 102 may compare rows of pixels between the second image 316-2 and the fourth image 316-4 to determine if the second image 316-2 and the fourth image 316-4 match. If they don't match, the device 102 may separate the first row (including the first image 316-1 and the second image 316-2) from the second row (including the third image 316-3 and the fourth image 316-4) or may perform additional matching steps to determine if the rows form a continuous image.

While the examples illustrated above form a shared context from a continuous series of images, the disclosure is not limited thereto. Instead, contiguous images may be separated by a number of intermediate images. To illustrate, the first image 316-1 is contiguous with the third image 316-3 in a vertical orientation, despite being separated by the second image 316-2. In some examples, the device 102 may compare a first image to multiple images within a range of the first image to associate the first image with a contiguous image even if the images are not in order.

Similarly, the examples illustrated above assume a left to right, top to bottom pattern. For example, the device 102 may detect a first row of images in a left to right arrangement and a second row of images in a left to right arrangement and associate the first row to the second row in a top to bottom arrangement. However, the disclosure is not limited thereto and the device 102 may detect contiguous images in any arrangement, including a right to left or bottom to top arrangement without departing from the disclosure. Additionally, the device 102 may perform multiple steps to detect any association between contiguous images. For example, the device 102 may compare right-hand columns of pixels in a first image with left-hand columns of pixels in a second image and compare left-hand columns of pixels in the first image with right-hand columns of pixels in the second image. Thus, the device 102 may potentially identify and associate contiguous images in any numbering system.

Figure 4A:
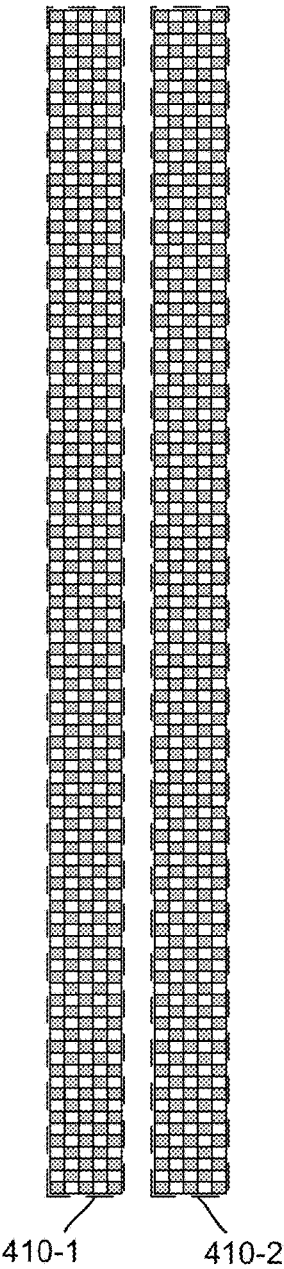
Figure 4B:
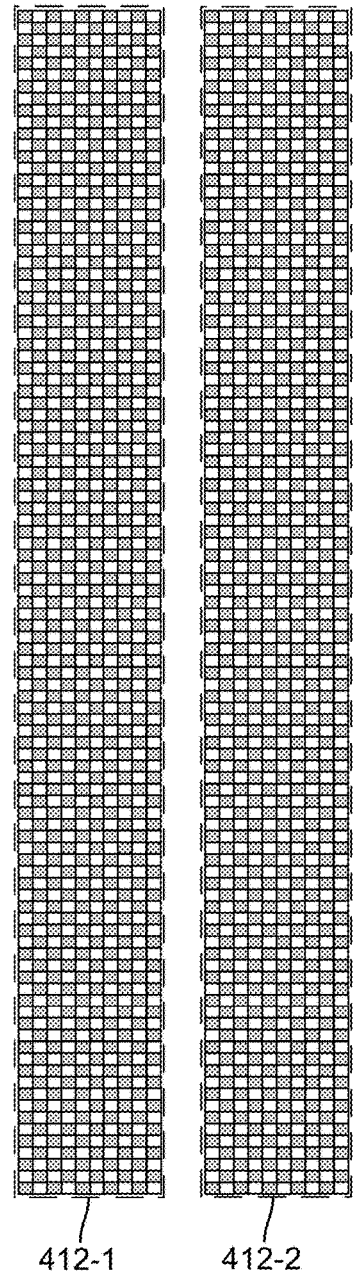

FIG. 4A illustrates an example of comparing first columns 410-1 of pixels from a first image to second columns 410-2 of pixels from a second image. A first width for the first columns 410-1 and the second columns 410-2 may be relatively small (e.g., 5 columns of pixels, such that each row is 5 pixels wide). FIG. 4B illustrates an example of comparing first columns 412-1 of pixels from the first image to second columns 412-2 of pixels from the second image. A second width for the first columns 412-1 and the second columns 412-2 may be greater than the first width (e.g., second width of 10 columns of pixels, such that each row is 10 pixels wide). When comparing the first image to the second image, the device 102 may use the first width, the second width or both the first width and the second width. For example, the device 102 may perform a first comparison using the first width and perform a second comparison using the second width.

Figure 4C:
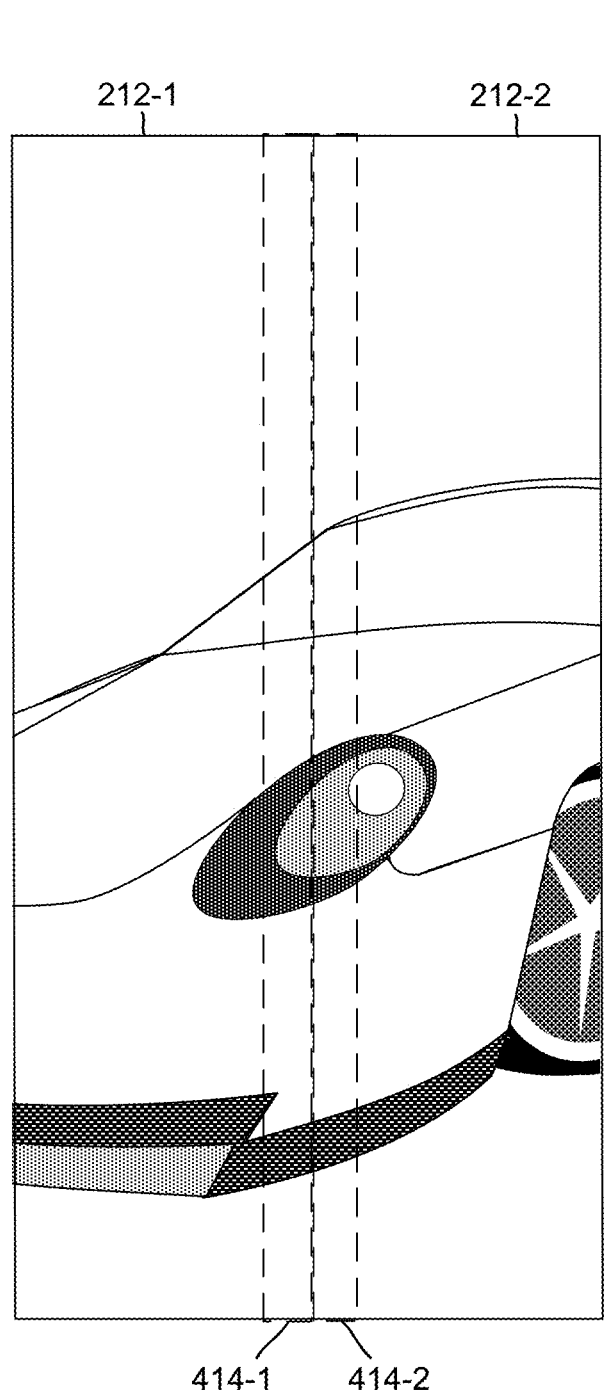

FIG. 4C illustrates an example of a comparison between the first image 212-1 and the second image 212-2 included in the shared context 210. In this example, the device 102 may compare first columns 414-1 of pixels from the first image 212-1 with second columns 414-2 of pixels from the second image 212-2.

FIG. 4D illustrates an example of comparing first rows 416-1 of pixels from a first image to second rows 416-2 of pixels from a second image. A first height for the first rows 416-1 and the second rows 416-2 may be relatively small (e.g., 5 rows of pixels, such that each column is 5 pixels high). FIG. 4E illustrates an example of comparing first rows 418-1 of pixels from the first image to second rows 418-2 of pixels from the second image. A second height for the first rows 418-1 and the second rows 418-2 may be greater than the first height (e.g., second height of 10 rows of pixels, such that each column is 10 pixels high). As discussed above, when comparing the first image to the second image, the device 102 may use the first height, the second height or both the first height and the second height. For example, the device 102 may perform a first comparison using the first height and perform a second comparison using the second height.

Figure 4F:
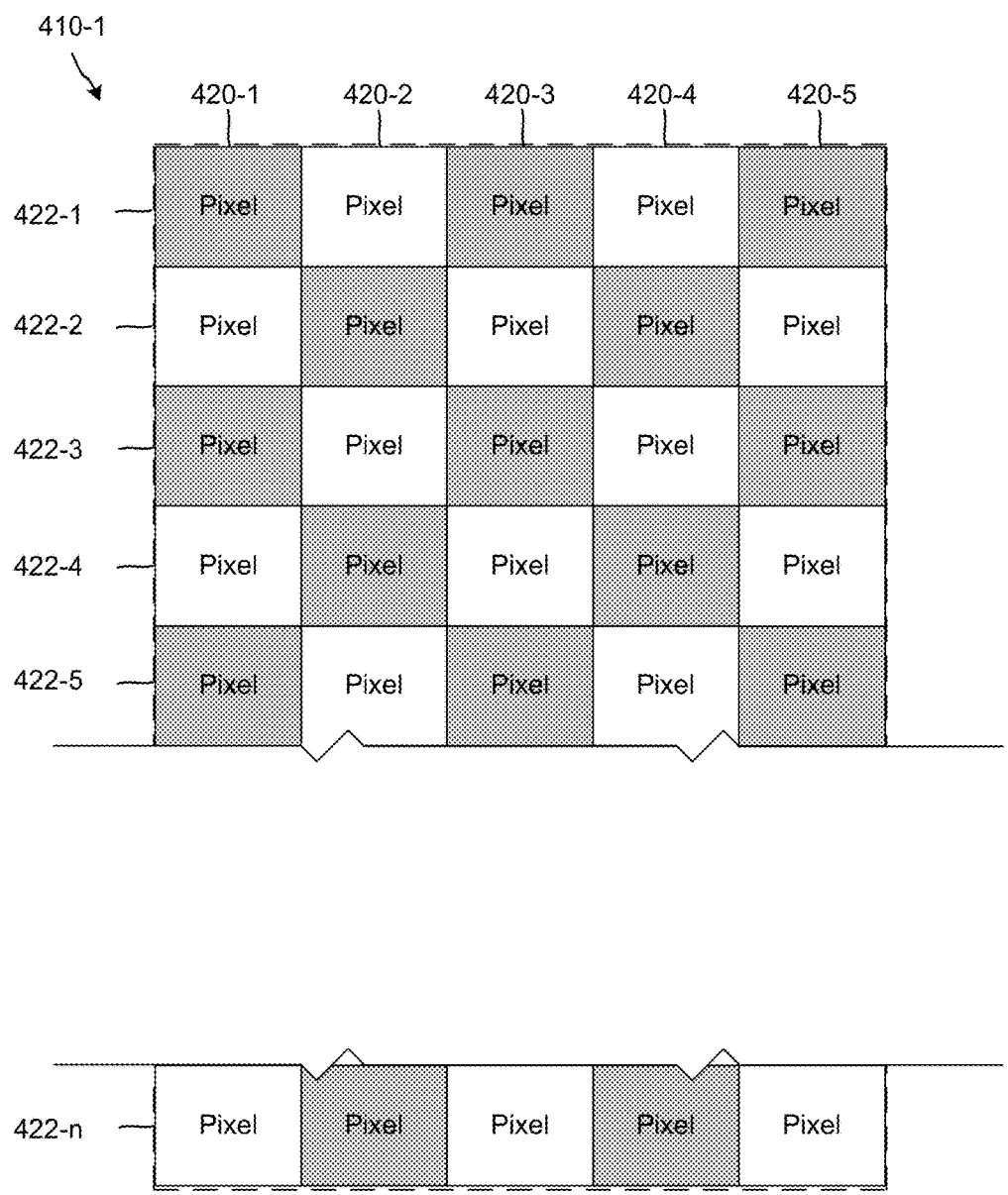

FIG. 4F illustrates an example of the first columns 410-1 in greater detail. As illustrated in FIG. 4F, the first columns 410-1 include first column 420-1, second column 420-2, third column 420-3, fourth column 420-4 and fifth column 420-5. Each column 420 is made up of a series of pixels, beginning with a first row 422-1 and continuing through rows 422-2 through 422-5 and beyond, ending at a final row 422-*n* of the first columns 410-1. During the comparison, pixels included in a particular row (e.g., a top row, such as first row 420-1) of the first columns may be compared to pixels included in a similar row (e.g., a top row) of the second columns.

Figure 5A:
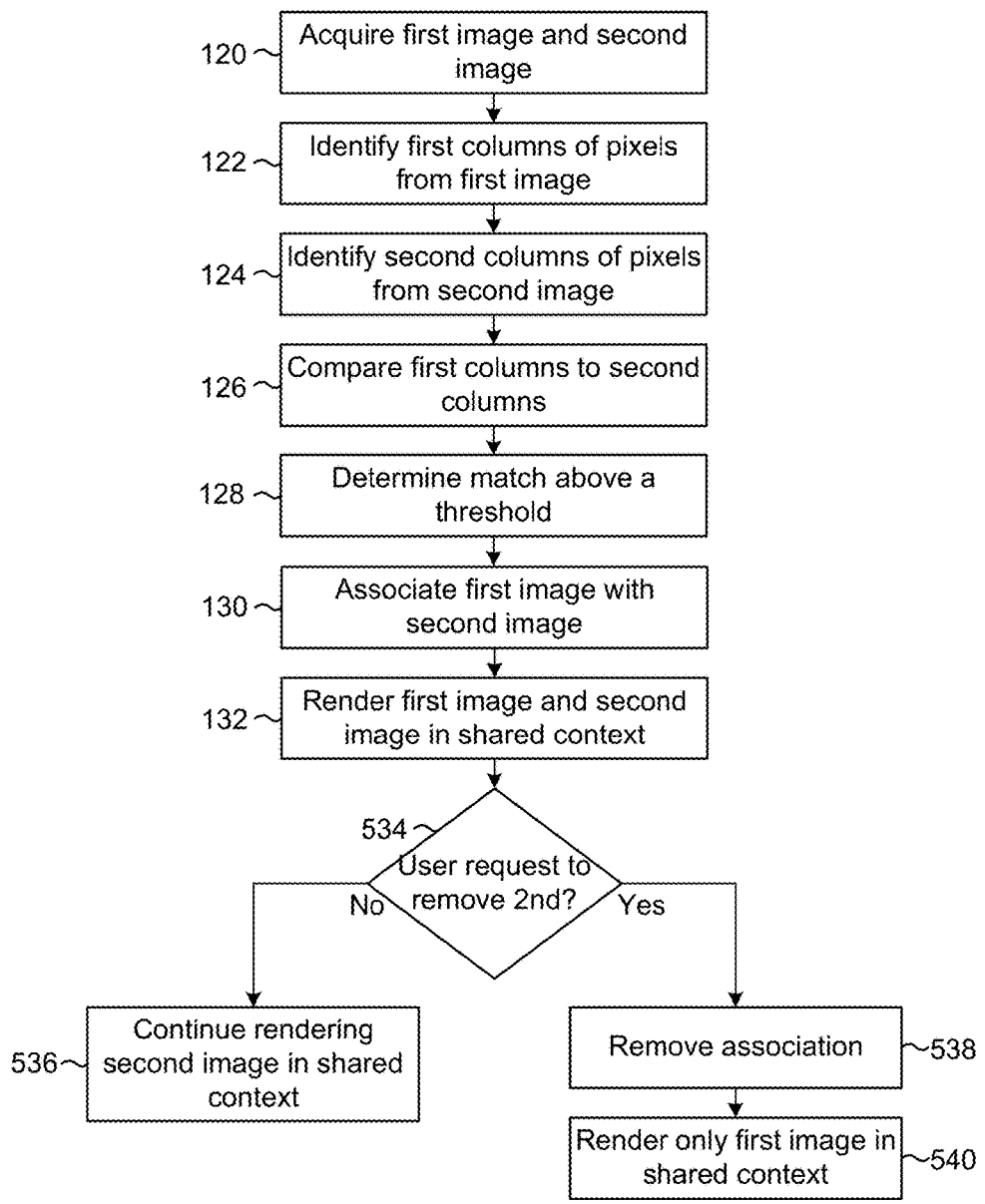
FIG. 5A-5B are flowcharts conceptually illustrating example methods for associating continuous images and displaying continuous images in a single context according to embodiments of the present disclosure.

FIG. 5A is a flowchart conceptually illustrating an example method for associating continuous images and displaying the continuous images in a single context according to embodiments of the present disclosure. FIG. 5A is intended to illustrate that the device 102 may confirm with a user of the device that the first image and the second image do in fact include a continuous image. Therefore, steps 120-132 are duplicated from FIG. 1, but a detailed description is omitted as these steps are discussed in greater detail above with regard to FIG. 1. After associating the first image with the second image and rendering the first image and the second image in a shared context, the device 102 may determine (534) if a user requests to remove the second image from the shared context. For example, the device 102 may display an icon requesting the user to confirm that the first image and the second image are part of a continuous image, or the device 102 may detect an input from the user indicating that the first image and the second image are not associated.

If the device 102 does not determine that the user requests that the second image be removed from the shared context, the device 102 may continue (536) rendering the first image and the second image in the shared context. However, if the device 102 determines that the user requests that the second image be removed from the shared context, the device 102 may remove (538) the association between the first image and the second image and may render (540) only the first image in the shared context.

In further examples, such as multiple images included in the shared context, the device 102 may remove the most recently associated image from the shared context, may remove multiple images from the shared context or may render the first image alone without rendering the shared context. For example, the device 102 may determine that four images are part of a continuous image and associate the four images in a shared context. After associating the fourth image and rendering the fourth image as part of the shared context, the device 102 may determine that the user requests that the fourth image be removed from the shared context. In a first example, the device 102 may remove the fourth image from the shared context and continue rendering the first three images, such as when the first three images are horizontally oriented and the fourth image is not associated with the other three images. In a second example, the device 102 may remove the third image and the fourth image from the shared context and continue rendering the first two image, such as when the first image and the second image are horizontally oriented and the third image and the fourth image are horizontally oriented, in a grid pattern. As the third image and the fourth image are associated with each other, the device 102 may assume that the first image and the second image are part of a first shared context and the third image and the fourth image are part of a second shared context. As a third example, the device 102 may remove the second image, the third image and the fourth image, rendering only the first image.

Figure 5B:
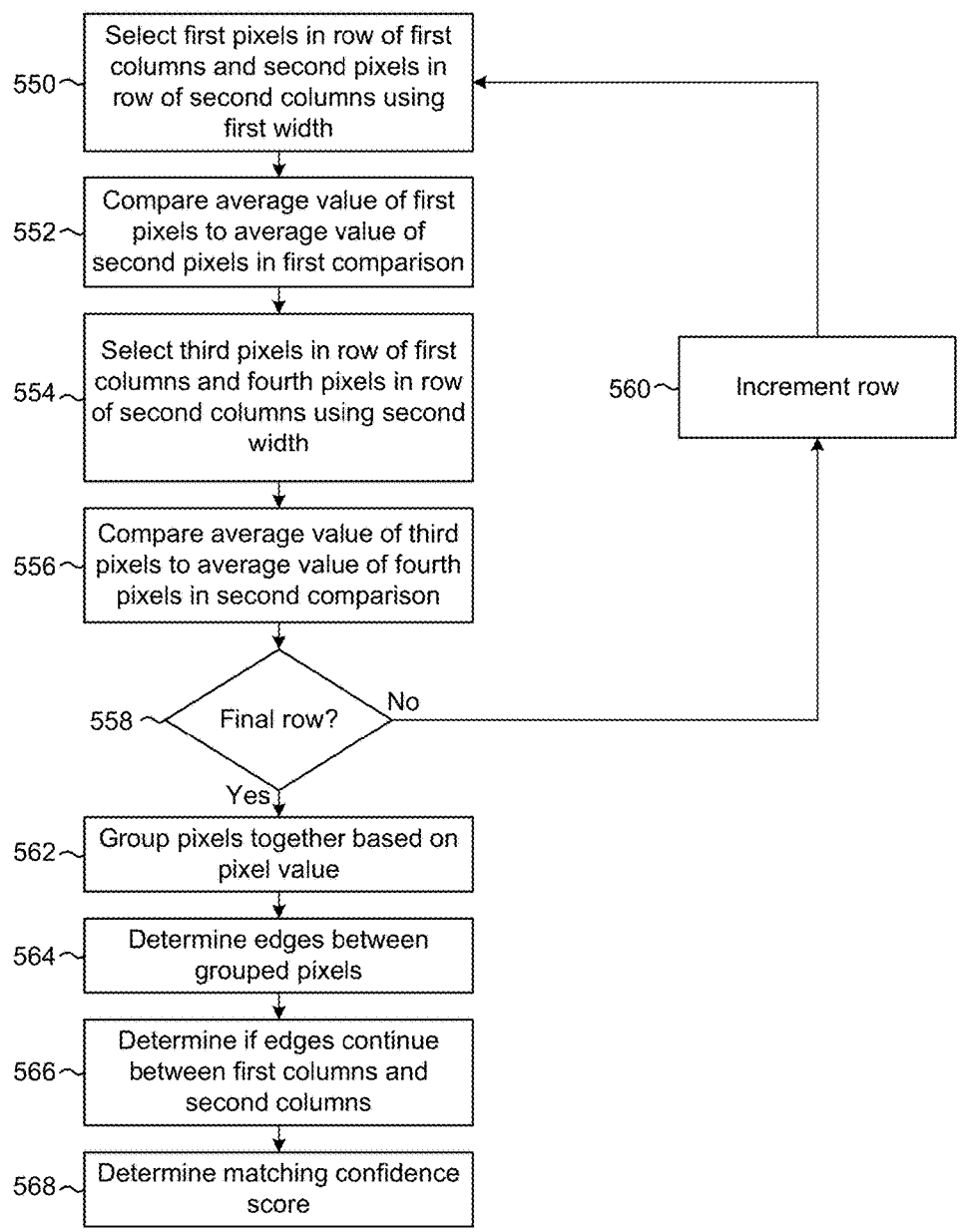

FIG. 5B illustrates an example of step 126 in greater detail. For example, FIG. 5B is a flowchart conceptually illustrating an example method for comparing first columns of pixels to second columns of pixels. The device 102 may use methods illustrated in the flowchart of FIG. 5B to determine a confidence score, a likelihood of matching, a number of mismatch errors or the like in order to determine if the first image should be associated with the second image. While FIG. 5B illustrates comparing first columns to second columns, the disclosure is not limited thereto and the flowchart of FIG. 5B may be used to compare first rows to second rows without departing from the disclosure.

The device 102 may select (550) first pixels in a row of first columns and second pixels in the row of second columns using a first width. For example, the device 102 may be determining if first columns of pixels (e.g., right-most columns of pixels) in a first image match second columns of pixels (e.g., left-most columns of pixels) in a second image. Thus, the device 102 may identify the row of pixels in the first image and select the first pixels from the first columns using the first width, beginning with the right-most pixel in the row and moving to the left. Similarly, the device 102 may identify the row of pixels in the second image and select the second pixels from the second columns using the first width, beginning with the left-most pixel in the row and moving to the right. The device 102 may then compare (552) an average value of the first pixels to an average value of the second pixels in a first comparison to see if they match within a certain threshold.

The device 102 may select (554) third pixels in the row of the first columns and fourth pixels in the row of second columns using a second width. For example, the device 102 may identify the row of pixels in the first image and select the third pixels from the first columns using the second width, beginning with the right-most pixel in the row and moving to the left. Similarly, the device 102 may identify the row of pixels in the second image and select the fourth pixels from the second columns using the second width, beginning with the left-most pixel in the row and moving to the right. The device 102 may then compare (556) an average value of the third pixels to an average value of the fourth pixels in a second comparison to see if they match within a certain threshold.

As an example, the first width may correspond to a width of the first columns 410-1 of pixels and the second columns 410-2 of pixels illustrated in FIG. 4A, whereas the second width may be relatively larger than the first width and may correspond to a width of the first columns 412-1 of pixels and the second columns 412-2 of pixels illustrated in FIG. 4B. As the first width includes fewer pixels, the first width may have a strong correlation when the transition between the first image and the second image is uniform in the continuous image. However, the continuous image may include edges or details in the transition between the first image and the second image, such that contiguous pixels have different pixel values. In this situation, the second width may be used to average a greater number of pixels to lessen an effect of the edges or details. The device 102 may use the results of the first comparison and/or the second comparison to determine if the first image and the second image are associated as part of a continuous image.

While FIG. 5B illustrates the device 102 comparing the first columns to the second columns using a first width and a second width, the present disclosure is not limited thereto. Instead, the device 102 may compare the first columns to the second columns using multiple widths, such as using a first width of 1 pixel, a second width of 2 pixels, a third width of 3 pixels, etc.

After performing steps 550-556, the device 102 may determine (558) if the row is a final row of the first image and the second image. If the row is not the final row, the device 102 may increment (560) the row and repeat steps 550-556. Thus, the device 102 may perform the first comparison and the second comparison on each row of pixels between the first image and the second image.

If the row is the final row, the device 102 may group (562) pixels together based on pixel values within the first columns and the second columns. For example, the device 102 may group pixels having similar pixel values, thus simplifying the first columns and the second columns as groups of pixels. The device 102 may determine (564) edges between the grouped pixels. For example, the device 102 may detect edge regions or transitions between different groups of pixels, which corresponds to relatively large changes in pixel values. The device 102 may determine (566) if the edges continue between the first columns and the second columns. For example, if the first image and the second image are part of a continuous image, shapes may extend from the first image to the second image and the edges may continue between the first image and the second image. Whereas steps 550-556 compare pixels within the same row, steps 562-566 may detect patterns that extend in a diagonal direction between the first image and the second image.

The device 102 may then determine (568) a matching confidence score, which may correlate to a likelihood that the first image and the second image form a continuous image. The confidence score may be compared to a threshold to determine if the device 102 renders the first image and the second image in a shared context. To determine that the first image and the second image are associated, the device 102 may determine how many rows match within the threshold in steps 552 and 556. As a first example, the device 102 may determine that the first image and the second image are associated if a certain percentage of rows match above the threshold in each comparison. As a second example, the device 102 may determine that the first image and the second image are associated based on a pattern in the comparison, such as a series of rows matching above the threshold and then a series of rows not matching above the threshold. For example, if rows 1-5 match, rows 6-10 do not match and rows 11-15 match, the device 102 may have a higher confidence score than if individual rows did not match in an inconsistent pattern.

While FIG. 5B illustrates several examples of determining if the first image and the second image form a continuous image, the disclosure is not limited thereto. Instead, the device 102 may use any image matching method known to one of skill in the art without departing from the disclosure.

The device may use methods illustrated in the flowcharts of FIGS. 1 and 5A to determine if two or more images form a continuous image in a horizontal orientation (e.g., using columns) or a vertical orientation (e.g., using rows). To determine if two or more images form a continuous image in a horizontal orientation, a vertical orientation and/or a grid orientation, the device 102 may use methods illustrated in the flowchart of FIG. 6A. As discussed in greater detail above with regard to FIG. 3D, to form a grid association the device 102 may first determine that a series of images are associated with a horizontal orientation (e.g., associate a first row of images) and then add additional rows of images to form the grid.

The device 102 may acquire (610) a first image and a second image. In this context, the first image and the second image may be any images in a series of images that are to be compared and are not limited to the first two images in the series of images. The device 102 may identify (612) first columns of pixels from the first image and identify (614) second columns of pixels from the second image. For example, in a left-right orientation, the device 102 may identify the first columns as columns of pixels furthest to the right of the first image and identify the second columns as columns of pixels furthest to the left of the second image. Thus, the first columns and the second columns would include contiguous pixels if the first image and the second image form a continuous image. To determine if the first image and the second image form a continuous image, the device 102 may compare (616) the first columns to the second columns to determine a likelihood of the first columns and the second columns being contiguous. For example, the device 102 may compare pixel values between the first columns and the second columns, average pixel values between corresponding rows in the first columns and the second columns, identify continuous edges or other patterns between the first columns and the second columns or use other image matching techniques known to one of skill in the art.

After comparing the first columns to the second columns, the device 102 may determine (618) whether the first columns and the second columns match above a threshold. The threshold may be a confidence score, a number of errors or inconsistencies, or the like, and may be stored and/or modified as a setting of the device 102. For example, a higher threshold may decrease a likelihood of false associations but also decrease a convenience to the user as related images may not be associated by the device 102, whereas a lower threshold may increase a likelihood of false associations but also increase a convenience to the user as related images may be associated by the device 102. If the device 102 determines that the first columns and the second columns match above the threshold, the device 102 may associate (620) the first image with the second image as left and right in a left-right orientation. The device 102 may then determine (622) if a subsequent image follows the second image. If a subsequent image followers the second image, the device 102 may replace (624) the first image with the second image, and the second image with the subsequent image, and repeat steps 610-618.

If the device 102 determines that the first columns and the second columns do not match above the threshold in step 618, the device 102 may determine (626) that no horizontal association exists between the first image and the second image. The device 102 may determine (628) if the first image is associated with an image to the left, such as if the first image is a right-page in a left-right orientation or associated with any prior image. If the first image is associated with an image to the left, the device 102 may replace (630) the first image with an image at the beginning of a row of images. If the first image is not associated with an image to the left, or after performing step 630, the device 102 may identify (632) first rows of pixels from the first image, identify (634) second rows of pixels from the second image and compare (636) the first rows to the second rows.

For example, in a top-bottom orientation, the device 102 may identify the first rows as rows of pixels closest to the bottom of the first image and identify the second rows as rows of pixels closest to the top of the second image. Thus, the first rows and the second rows would include contiguous pixels if the first image and the second image form a continuous image. To determine if the first image and the second image form a continuous image, the device 102 may compare (636) the first rows to the second rows to determine a likelihood of the first rows and the second rows being contiguous. For example, the device 102 may compare pixel values between the first rows and the second rows, average pixel values between corresponding columns in the first rows and the second rows, identify continuous edges or other patterns between the first rows and the second rows or use other image matching techniques known to one of skill in the art.

After comparing the first rows to the second rows, the device 102 may determine (638) whether the first rows and the second rows match above a threshold. The threshold may be a confidence score, a number of errors or inconsistencies, or the like, and may be stored and/or modified as a setting of the device 102, as discussed above with regard to step 618. If the device 102 determines that the first rows and the second rows match above the threshold, the device 102 may associate (640) the first image with the second image as top and bottom in a top-bottom orientation. The device 102 may then perform step 622 to determine if a subsequent image follows the second image and repeat step 624 if a subsequent image followers the second image, as discussed above. If the device 102 determines that the first rows and the second rows do not match above the threshold, the device 102 may determine (642) that no vertical association exists between the first image and the second image.

If the device 102 determines that there isn't a subsequent image in step 622 or that no vertical association exists in step 642, the device 102 may render (644) associated images in one context. For example, the device 102 may align and stitch each of the associated images, excluding page margins and other non-image content, and may display the associated images in a single context, allowing a user of the device 102 to pan between each of the associated images without interruption or page breaks.

Figure 6A:
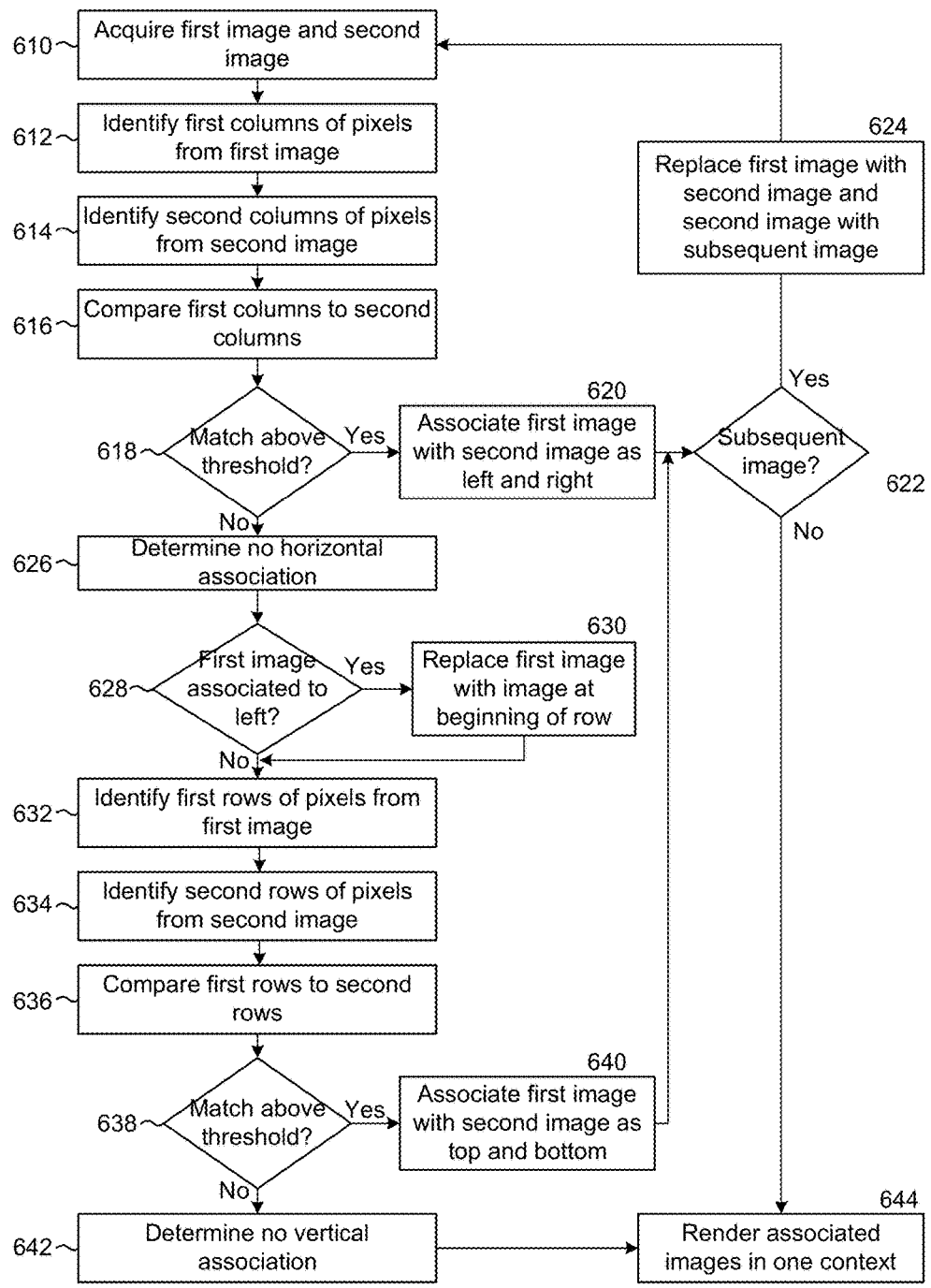
FIG. 6A is a flowchart conceptually illustrating an example method for associating continuous images.
Figure 6B:
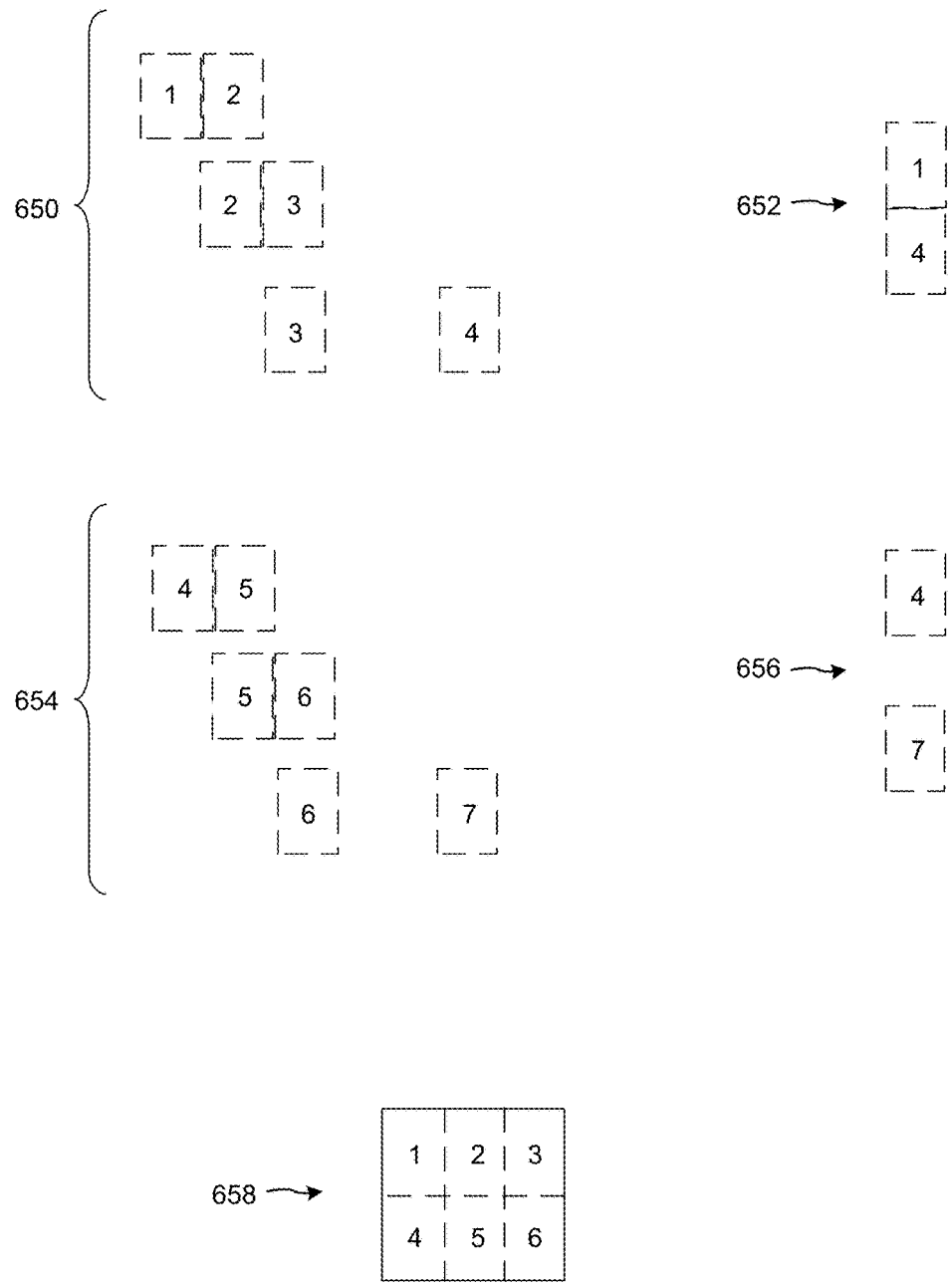
FIGS. 6B-6C illustrate associating continuous images according to embodiments of the present disclosure.

To illustrate the flowchart of FIG. 6A, FIG. 6B illustrates the device 102 performing steps 610-644 in a simple example to determine a grid pattern including "Image 1" through "Image 6" in two separate rows. For example, example 650 illustrates that the device 102 may perform steps 610-624 repeatedly to determine that "Image 1" is associated with "Image 2" in a horizontal orientation and that "Image 2" is associated with "Image 3" in a horizontal orientation, but that first columns from "Image 3" do not match second columns from "Image 4" above the threshold in step 618. Therefore, the device 102 may determine that there isn't a horizontal association between "Image 3" and "Image 4." As "Image 3" is a right-most image in a first row of images, it is unlikely that "Image 3" is associated with "Image 4" in a vertical orientation. Thus, instead of comparing "Image 3" to "Image 4" in a vertical orientation, the device 102 may determine a left-most image in the first row under the assumption that "Image 4" is a left-most image in a second row of images. Therefore, the device 102 may determine that the first image (e.g., "Image 3") is associated with images to the left (e.g., "Image 1" and "Image 2") in step 628 and substitute an image at the beginning of the row (e.g., "Image 1") for the current 'first image' (e.g., "Image 3") in step 630. Example 652 illustrates that the device 102 may perform steps 626-640 to determine that "Image 1" is associated with "Image 4" in a vertical orientation.

Example 654 illustrates that the device 102 may perform steps 622-624 to determine that there are subsequent images, replace the first image (e.g., "Image 1") with the second image (e.g., "Image 4") and replace the second image (e.g., "Image 4") with a subsequent image (e.g., "Image 5"). The device 102 may then repeat steps 610-624 to determine that "Image 4" is associated with "Image 5" in a horizontal orientation and that "Image 5" is associated with "Image 6" in a horizontal orientation, but that first columns from "Image 6" do not match second columns from "Image 7" above the threshold in step 618. Therefore, the device 102 may determine that there isn't a horizontal association between "Image 6" and "Image 7." As discussed above, as "Image 6" is a right-most image in the second row of images, it is unlikely that "Image 6" is associated with "Image 7" in a vertical orientation. Thus, instead of comparing "Image 6" to "Image 7" in a vertical orientation, the device 102 may determine a left-most image in the second row under the assumption that "Image 7" is a left-most image in a subsequent row of images. Therefore, the device 102 may determine that the first image (e.g., "Image 6") is associated with images to the left (e.g., "Image 4" and "Image 5") in step 628 and substitute an image at the beginning of the row (e.g., "Image 4") for the current 'first image' (e.g., "Image 6") in step 630.

Example 656 illustrates that the device 102 may perform steps 626-628 and 642 to determine that "Image 4" is not associated with "Image 7" in a vertical orientation. As a result, example 658 illustrates that the device 102 associates "Image 1" to "Image 6" in a grid pattern, with "Image 1," "Image 2" and "Image 3" in a first row and "Image 4," "Image 5" and "Image 6" in a second row.

Figure 6C:
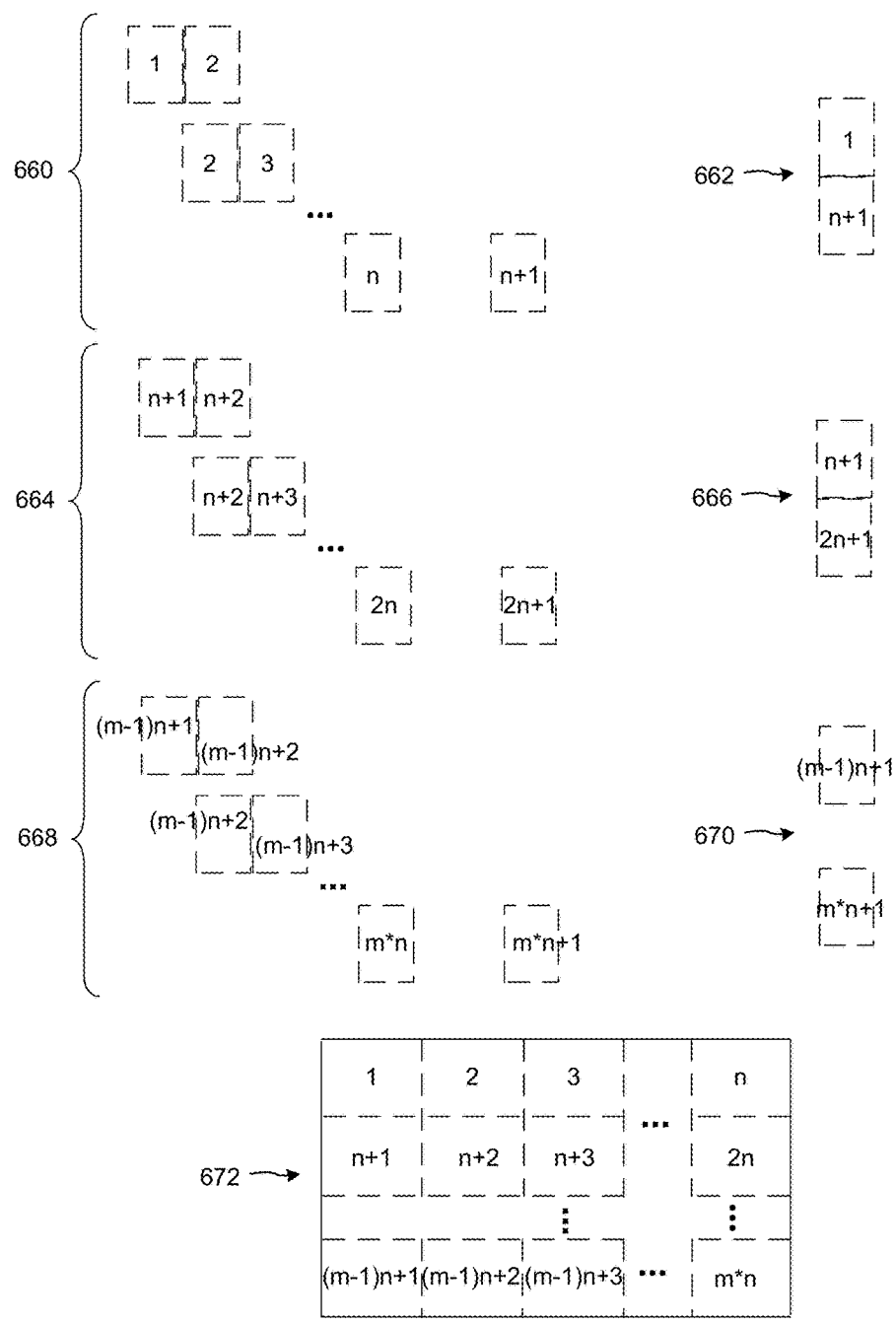

FIG. 6C illustrates the device 102 performing steps 610-644 in an open-ended example to determine a grid pattern including n columns and m rows, where n and m are natural numbers. As illustrated in FIG. 6C, example 660 illustrates the device 102 associating a series of images (e.g., from "Image 1" to "Image n") in a horizontal orientation as a first row. Example 662 illustrates the device 102 associating the beginning of the first row (e.g., "Image 1") with a beginning of a second row (e.g., "Image n+1") in a vertical orientation. Example 664 illustrates the device 102 associating a series of images (e.g., from "Image n+1" to "Image 2n") in a horizontal orientation as a second row, and example 666 illustrates the device 102 associating the beginning of the second row (e.g., "Image n+1") with a beginning of a third row (e.g., "Image 2n+1").

The device 102 continues to repeat steps 610-640 to associate a series of images in a row and to associate a beginning of a row with a beginning of a subsequent row to form the grid. To complete the grid, example 668 illustrates the device 102 associating a series of images (e.g., from "Image (m−1)n+1") to "Image m*n") in a horizontal orientation as a final row, but determining that a final image (e.g., "Image m*n") is not associated with a subsequent image (e.g., "Image m*n+1") in a horizontal orientation. Example 670 illustrates the device 102 determining that the beginning of the final row (e.g., "Image (m−1)n+1") does not associate with the subsequent image (e.g., "Image m*n+1") in a vertical orientation. As a result, example 672 illustrates that the device 102 associates the associated images in a grid pattern, the grid including n columns and m rows.

A first image and a second image may be part of a continuous image despite the first image and the second image having mismatched dimensions. For example, an image may continue from a left page to a right page in a left-right page spread, but the image may cover half of the left page and an entirety of the right page. While this may not occur frequently, the device 102 may perform the example method illustrated in FIG. 7A to associate images with mismatched dimensions. The device 102 may acquire (710) a first image and a second image and may determine (712) a mismatch in dimension between the first image and the second image. In this example, a dimension of the first image may be less than a dimension of the second image, but the disclosure is not limited thereto.

The device 102 may identify (714) first columns from the first image and identify (716) second columns from the second image, the second columns aligned with the first columns at the top. For example, a beginning row of the first columns may be aligned with a beginning row of the second columns, such that a final row of the first columns corresponds to a middle of the second columns. The device 102 may compare (718) the first columns to the second columns and determine (720) if the first columns match the second columns above a threshold. If the device 102 determines that the first columns match the second columns above the threshold, the device 102 may associate (722) the first image to the second image, aligned at the top of the first image and the second image. For example, FIG. 7B illustrates a first image 740-1 and a second image 740-2 with mismatched dimensions aligned at the top.

If the device 102 determines that the first columns do not match the second columns above the threshold, the device 102 may identify (724) third columns from the second image, aligned at the bottom. For example, a final row of the first columns may be aligned with a final row of the third columns, such that a beginning row of the first columns corresponds with a middle of the third columns. The device 102 may compare (726) the first columns to the third columns and determine (728) if the first columns match the third columns above a threshold. If the device 102 determines that the first columns match the third columns above the threshold, the device 102 may associate (730) the first image with the second image, aligned at the bottom of the first image and the second image. For example, FIG. 7C illustrates a first image 742-1 and a second image 742-2 with mismatched dimensions aligned at the bottom. If the device 102 determines that the first columns and the third columns do not match above the threshold, the device 102 may determine (732) that there is no association between the first image and the second image.

Figure 7A:
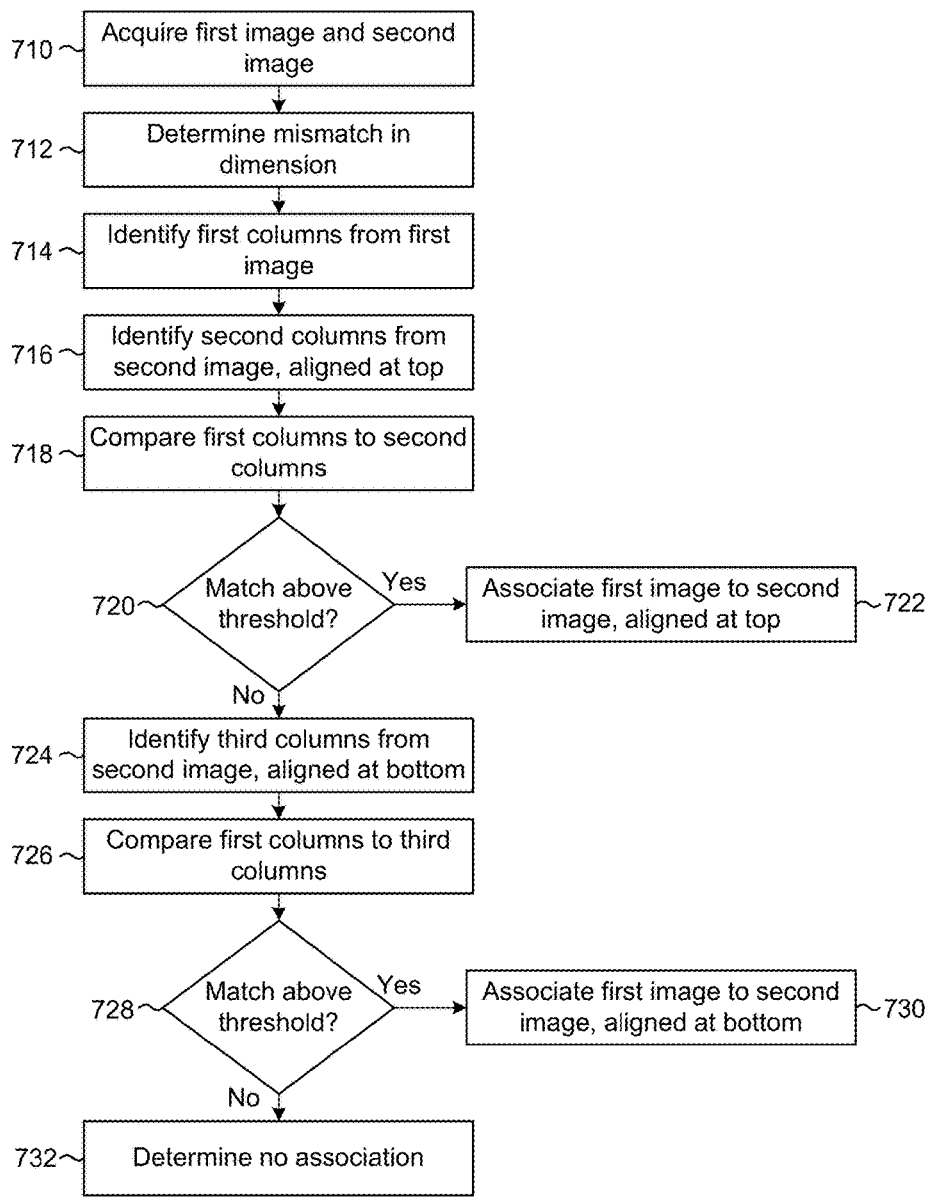
FIG. 7A is a flowchart conceptually illustrating an example method for associating continuous images having mismatched dimensions.
Figure 7B:
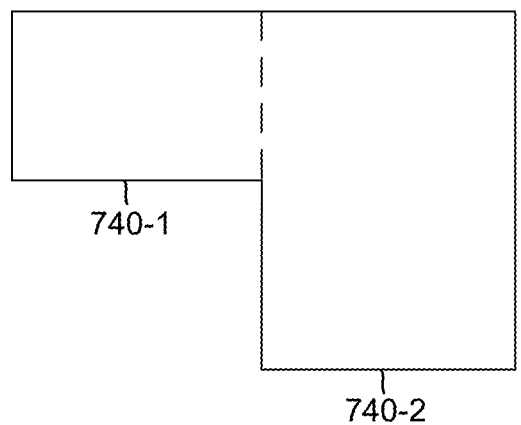
FIGS. 7B-7C illustrate associated images having mismatched dimensions according to embodiments of the present disclosure.
Figure 7C:
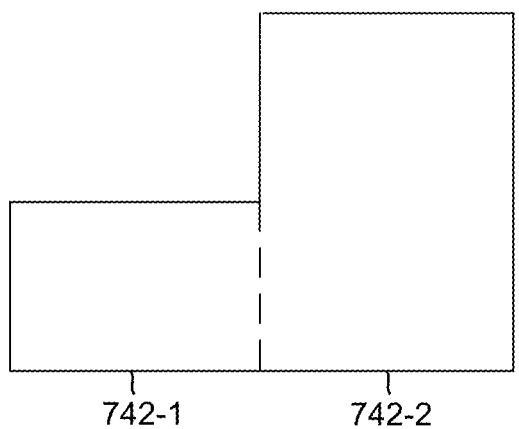

While FIGS. 7A-7C illustrate that the second columns are aligned at a top of the second image and the third columns are aligned at a bottom of the second image, the present disclosure is not limited thereto. Instead, the association can happen at any offset length from the top. Thus, a mismatched first image and a second image may be aligned anywhere between the top and the bottom based on a comparison. For example, the first image may have a pixel height of 30 pixels, the second image may have a pixel height of 100 pixels and the first image may be aligned with the second image between rows 60 and 90 of the second image. Thus, the device 102 may identify first columns from the first image, the first columns including every row of pixels in the first image, and identify second columns from the second image, the second columns including every row of pixels in the second image. To determine if the first columns are associated with the second columns, the device 102 may compare the first columns to the second columns using multiple offsets. Thus, the device 102 may compare the first columns to the second columns at each of the multiple offsets and determine if the first columns match the second columns above a threshold for each of the multiple offsets. If the device 102 determines that the first columns match the second columns above the threshold for a specific offset, the device 102 may associate the first image to the second image, aligned using the specific offset.

FIGS. 8A-8B illustrates examples of viewing multiple images associated in a single context according to embodiments of the present disclosure. As illustrated in FIG. 8A, the device 102 may determine that a first image 812-1, a second image 812-2, a third image 812-3, a fourth image 812-4 and a fifth image 812-5 are horizontally associated in a shared context 810. The device 102 may display the shared context 810 in its entirety in a first moment 800, and may alternate between varying magnifications without being affected by page breaks or displaying margins.

To illustrate an improved user experience resulting from the shared context 810, the device 102 may display the first image 812-1 in a second moment 802. As a user of the device 102 pans to the right across the first image 812-1, the device 102 may display portions of the first image 812-1 and the second image 812-2 in a third moment 804, portions of the third image 812-3 and the fourth image 812-4 in a fourth moment 806 and the fifth image 812-5 in a fifth moment 808. Upon reaching the fifth image 812-5, the device 102 may stop panning, may display an animation indicating that an edge of the shared context 810 has been reached or may progress to a new image, page, shared context or the like following the fifth image 812-5. Thus, the device 102 may provide additional convenience as the user may pan and zoom between each of the images 812 included in the shared context 810, enabling the user to view the shared context 810 in a controlled manner without interruptions or gaps between the images 812.

While FIG. 8A illustrates the content including images 812 without interruptions, the content may include text, margins, borders, unrelated images or the like. Therefore, as part of associating the images 812 in the shared context 810, the device 102 may align each of the images 812 and stitch them together without margins, borders, intervening text or unrelated images. In some examples, the device 102 may need to determine an edge of each of the images 812 in order to compare the images 812 without including borders or other unrelated information. For example, the first image 812-1 may include a white border as part of the first image 812-1, such that combining the first image 812-1 with the second image 812-2 would create a gap between the first image 812-1 and the second image 812-2. In these situations, the device 102 may identify an edge of the first image 812-1 based on details included in the first image 812-1, such as by ignoring areas of pixels having identical pixel values close to an edge of the first image 812-1. For example, the device 102 may determine that right-most columns of pixels in the first image 812-1 share a pixel value and may iteratively select columns of pixels to the left until determining that the selected columns of pixels include varied pixel values. Similarly, the device 102 may determine that left-most columns of pixels in the second image 812-2 share a pixel value and may iteratively select columns of pixels to the right until determining that the selected columns of pixels include varied pixel values. Thus, while a top or bottom of the first image 812-1 and the second image 812-2 may include the border, the transition between the first image 812-1 and the second image 812-2 does not include the border so that there are no gaps.

In some examples, a first image and a second image may be unrelated but edges of the first image and the second image may match. For example, a shared background color or a consistent pattern used in the first image and the second image may cause the device 102 to associate the first image with the second image. To prevent this, the device 102 may perform the process described above to ignore areas of identical pixel values and determine if the varied pixel values of the first image match the varied pixel values of the second image. In addition, the device 102 may perform pattern matching or other methods to determine if the first image is related to the second image. To illustrate, two unrelated drawings on a blank background may have matching edges (e.g., the blank background) but not include matching patterns. In contrast, two related images of a continuous drawing on a blank background may have matching edges (e.g., the blank background) but also include matching patterns (e.g., shapes extending from the first image to the second image) or other distinctive elements that the device 102 may use to associate the related images. In addition, the user may be prompted to confirm that an association exists upon the device 102 displaying the first image and the second image in a shared context. If the user rejects the association, the device 102 may display the first image and the second image as separate images.

In some examples, the device 102 may load the first image 812-1 and then associate the first image 812-1 with the second image 812-2, the second image 812-2 with the third image 812-3 and so on. Thus, the device 102 may perform the association in real time while displaying the content. As a first example, the device 102 may receive a command to display the first image 812-1 and may associate each of the images 812 prior to displaying the first image 812-1. Thus, the device 102 may display either the first image 812-1 or an entirety of the shared context 810, based on user preference. As a second example, the device 102 may display the first image 812-1 and, upon displaying a right border of the first image 812-1, determine that the right border of the first image 812-1 matches a left border of the second image 812-2 and display the second image 812-2 as part of the shared context. Similarly, upon displaying a right border of the second image 812-2, the device 102 may determine that the right border of the second image 812-2 matches a left border of the third image 812-3. Therefore, the device 102 may determine for each image being displayed if a neighboring image matches the image.

In other examples, the device 102 may associate the images 812 prior to displaying the content, such as upon receiving the content or upon loading the content in an application to display the content. For example, upon downloading or otherwise acquiring the content including the images 812, the device 102 may perform the steps of FIGS. 1, 5A, 5B, 6A and/or 7A to associate related images included in the content.

In addition to forming associations before displaying the content, the device 102 may be used to generate an electronic publication and may embed associations between multiple images included in a continuous image within the content itself. For example, the device 102 may receive the content for generating the electronic publication, including text, images and/or other data. Alternatively, the device 102 may receive an electronic publication, may associate multiple images included in a continuous image and generate an updated electronic publication including the embedded associations. As part of generating the electronic publication, the device 102 may associate related images and embed the association within the content so that the associated images may be displayed in a shared context. Thus, multiple images may be stored as separate pages of content but associated so that they are displayed together.

In some situations, such as when using a fixed resolution per page or other limitations, a single page may not include enough detail or information to display fine details of an image. For example, a large map may include fine detail such as town names that are not visible to a user at a low magnification, and depending on a resolution of the map, the device 102 may not be able to enlarge the map to display the fine detail. To provide additional detail in the electronic publication, the device 102 may divide a source image into multiple images and associate the multiple images with each other. Thus, assuming that the device 102 would have had to downsize the source image to include a similar amount of data as each image of the multiple images to fit on a single page, the source image may be displayed in greater detail using the multiple images rather than the single page. As part of the electronic publication, the device 102 may either associate each of the multiple images with a separate page of content (e.g., multiple pages of content), increasing a page count, or may associate each of the multiple images with a single page (e.g., a single page of content). Thus, the device 102 may include additional data beyond the fixed resolution per page.

To generate multiple images from a single image, the device 102 may acquire (910) a source image and determine (912) that the source image includes detail. The device 102 may determine that the source image includes detail using any method known to one of skill in the art, such as a frequency of variations within the source image or a size and/or resolution of the source image. The device 102 may determine (914) a number of columns based on a desired width and determine (916) a number of rows based on a desired height. The desired width and the desired height may be based on a resolution per page or other limitations based on a layout of the content. The device 102 may then generate (918) multiple images using the number of rows and columns and associate (920) the multiple images. Optionally, the device 102 may associate (922) the multiple images with a location of the source image. For example, instead of including each of the multiple images as a separate page, the device 102 may associate the multiple images with a single page and embed additional data in the electronic publication.

Figure 9A:
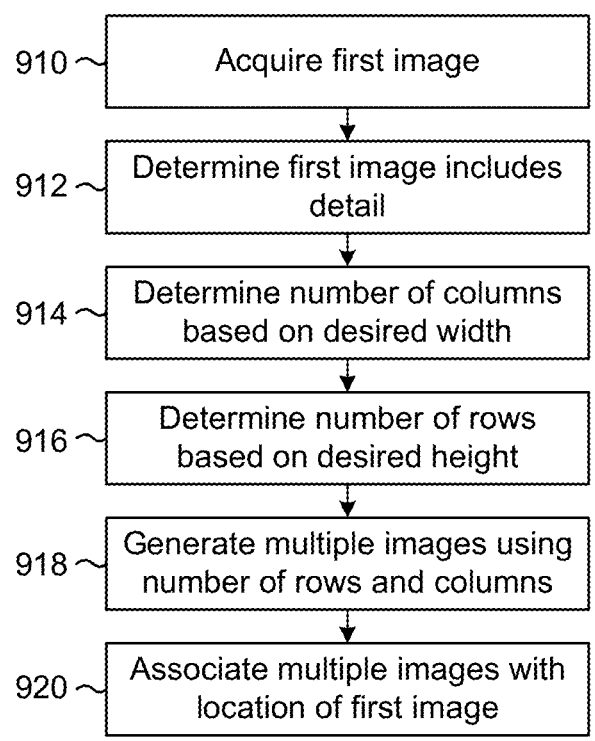
FIG. 9A is a flowchart conceptually illustrating an example method for separating a single image into a number of associated images.

FIG. 9B illustrates an example of the device 102 increasing detail by separating a first image 930 into multiple images 934-1 through 934-5. As illustrated in FIG. 9B, the first image 930 may be used to generate a single-page image 932 having a fixed resolution. While the device 102 may magnify the single-page image 932, the fixed resolution limits an amount of magnification available and/or fine details visible. Instead, the first image 930 may be used to generate a first image 934-1, a second image 934-2, a third image 934-3, a fourth image 934-4 and a fifth image 934-5. In contrast to the single-page image 932, the images 934 provide additional detail as they include at least five times the fixed resolution available to the single-page image 932.

FIG. 9C illustrates an example of the device 102 increasing detail by separating a first image 940 into multiple images 944. As illustrated in FIG. 9B, the first image 940 may be used to generate a single-page image 942 having a fixed resolution. While the device 102 may magnify the single-page image 942, the fixed resolution limits an amount of magnification available and/or fine details visible. Instead, the first image 940 may be used to generate a first image 944-1, a second image 944-2, a third image 944-3 and a fourth image 944-4 in a grid pattern. In contrast to the single-page image 942, the images 944 provide additional detail as they include at least four times the fixed resolution available to the single-page image 942.

Figure 10:
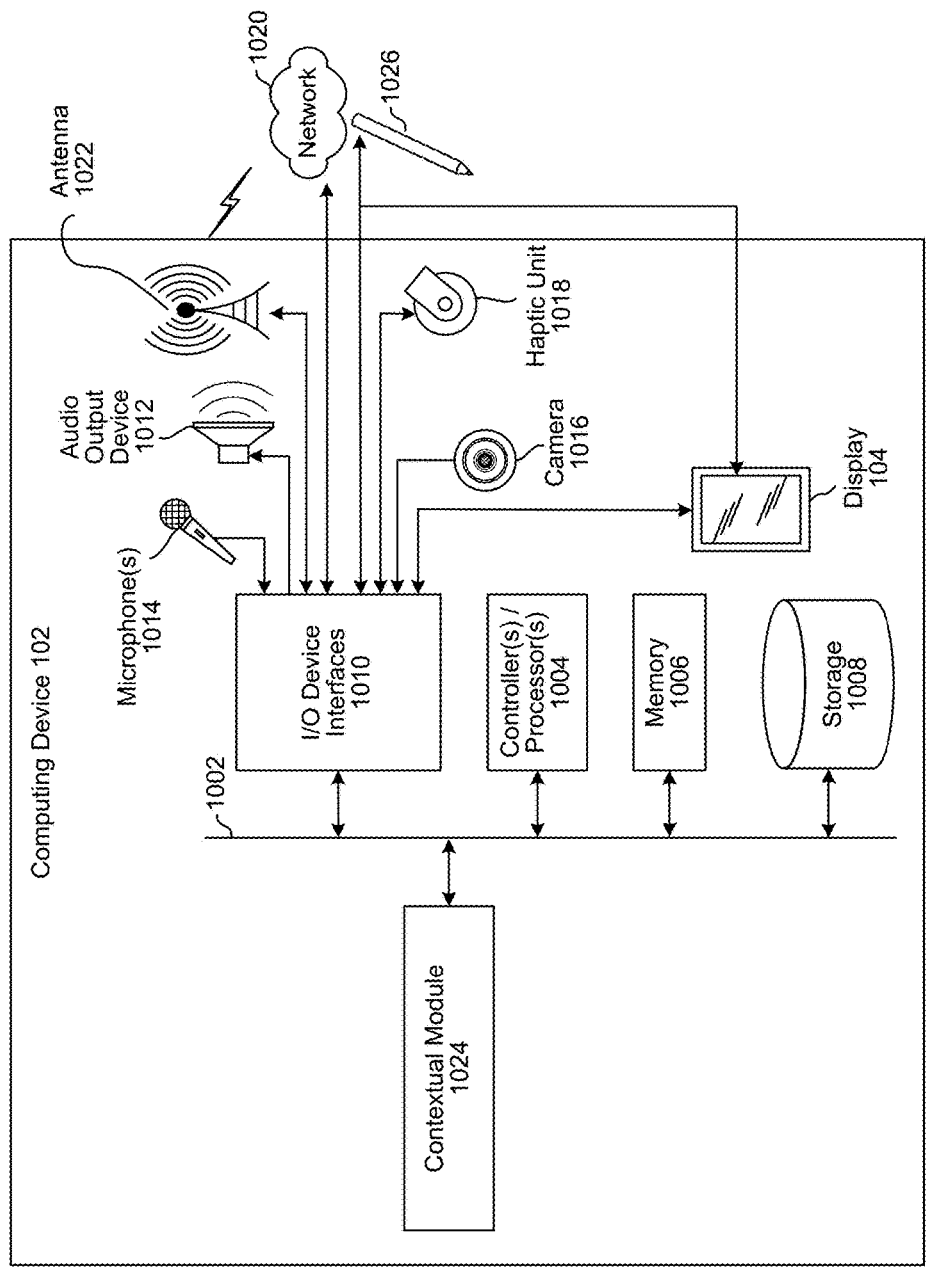
FIG. 10 is a block diagram conceptually illustrating example components of a computing device according to embodiments of the present disclosure.

FIG. 10 is a block diagram conceptually illustrating example components of a computing device 102. In operation, the computing device 102 may include computer-readable and computer-executable instructions that reside on the computing device 102, as is discussed further below. Components illustrated as part of the device 102 may be omitted, while other components not illustrated may also be included in the device 102. The device 102 may be a computer, set-top box or a portable device, such as an electronic reader, a smart phone, tablet, smart watch, or the like.

As illustrated in FIG. 10, the computing device 102 may include an address/data bus 1002 for conveying data among components of the computing device 102. Each component within the computing device 102 may also be directly connected to other components in addition to (or instead of) being connected to other components across the bus 1002.

The computing device 102 may include one or more microcontrollers/controllers/processors 1004 that may each include a central processing unit (CPU) for processing data and computer-readable instructions, and a memory 1006 for storing data and instructions. The memory 1006 may include volatile random access memory (RAM), non-volatile read only memory (ROM), non-volatile magnetoresistive (MRAM) and/or other types of memory. The computing device 102 may also include a data storage component 1008, for storing data and microcontrollers/controller/processor-executable instructions (e.g., instructions to perform one or more steps of the methods illustrated in and described with reference to FIGS. 1, 5A, 5B, 6A, 7A and 9A). The data storage component 1008 may include one or more non-volatile storage types such as magnetic storage, optical storage, solid-state storage, etc. The computing device 102 may also be connected to removable or external non-volatile memory and/or storage (such as a removable memory card, memory key drive, networked storage, etc.) through input/output device interfaces 1010.

Computer instructions for operating the computing device 102 and its various components may be executed by the microcontroller(s)/controller(s)/processor(s) 1004, using the memory 1006 as temporary "working" storage at runtime. The computer instructions may be stored in a non-transitory manner in non-volatile memory 1006, storage 1008, or an external device. Alternatively, some or all of the executable instructions may be embedded in hardware or firmware in addition to or instead of software.

The computing device 102 includes input/output device interfaces 1010. A variety of components may be connected through the input/output device interfaces 1010.

The computing device 102 further includes a contextual module 1024 that may control associating related images in a shared context as discussed above, specifically with regard to FIGS. 1, 5A, 5B, 6A, 7A and 9A. Some or all of the controllers/modules of the contextual module 1024 may be executable instructions that may be embedded in hardware or firmware in addition to, or instead of, software. In one embodiment, the computing device 102 may operate using an Android® operating system (such as, Android® 4.3 Jelly Bean and/or Android® 4.4 KitKat).

A variety of components may be connected to the device 102 through the input/output device interfaces 1010, such as the display or display screen 104 having a touch surface or touchscreen; an audio output device for producing sound, such as speaker(s) 1012; one or more audio capture device(s), such as a microphone or an array of microphones 1014; one or more image and/or video capture devices, such as camera(s) 1016; one or more haptic units 1018; and other components. The display 104, speaker(s) 1012, microphone(s) 1014, camera(s) 1016, haptic unit(s) 1018, and other components may be integrated into the computing device 102 or may be separate.

The display 104 may be a video output device for displaying images. The display 104 may be a display of any suitable technology, such as a liquid crystal display, an organic light emitting diode display, electronic paper, an electrochromic display, a cathode ray tube display, a pico projector or other suitable component(s). The display 104 may also be implemented as a touchscreen and may include components such as electrodes and/or antennae for use in detecting stylus input events or detecting when a stylus is hovering above, but not touching, the display 104, as described above.

The input/output device interfaces 1010 may also include an interface for an external peripheral device connection such as universal serial bus (USB), FireWire, Thunderbolt, Ethernet port or other connection protocol that may connect to networks 1020. The input/output device interfaces 1010 may also include a connection to antenna 1022 to connect one or more networks 1020 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc. that can operate with a touchscreen.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware, and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for associating images for display on a device, the method comprising:
   receiving, by the device, a first image associated with a first page of an electronic graphical magazine;
   receiving a second image associated with a second page of the electronic graphical magazine;
   determining the second page follows the first page in the electronic graphical magazine;
   identifying a first image section along a right-most edge of the first image, the first image section comprising a first number of pixel columns;
   identifying a second image section along a left-most edge of the second image, the second image section comprising a second number of pixel columns, wherein the first number and the second number are equal;
   comparing a first pixel row of the first image section to a second pixel row of the second image section, wherein the first pixel row is a first distance from a first top of the first image section and the second pixel row is a second distance from a second top of the second image section;
   determining that a first average pixel value of the first pixel row is within a first range of a second average pixel value of the second pixel row;
   determining that content of the first image is associated with content of the second image;
   aligning the first image with the second image; and
   displaying the first image and the second image simultaneously on a display of the device.

2. The computer-implemented method of claim 1, further comprising:
   identifying a first border within the first image section, each pixel included in the first border having a pixel value within a second range;
   removing the first border along the right-most edge of the first image to create an altered first image, the first image having first dimensions and the altered first image having second dimensions smaller than the first dimensions;
   identifying a second border within the second image section, each pixel included in the second border having a pixel value within the second range;
   removing the second border along the left-most edge of the second image to create an altered second image, the second image having third dimensions and the altered second image having fourth dimensions smaller than the third dimensions; and
   wherein the displaying displays the altered first image and the altered second image.

3. The computer-implemented method of claim 1, wherein the aligning further comprises:
   determining an offset between the first distance and the second distance; and
   aligning the first image with the second image using the offset, such that the first pixel row is aligned with the second pixel row.

4. The computer-implemented method of claim 1, further comprising:
   receiving a third image associated with a third page of the electronic graphical magazine;
   identifying a third image section along a bottom-most edge of the first image, the third image section comprising a third number of pixel rows;

identifying a fourth image section along a top-most edge of the third image, the fourth image section comprising a fourth number of pixel rows, wherein the third number and the fourth number are equal;

comparing a first pixel column of the third image section to a second pixel column of the fourth image section, wherein the first pixel column is a third distance from a left-most edge of the first image section and the second pixel column is a fourth distance from a left-most edge of the third image section;

determining that a third average pixel value of the first pixel column is within a second range of a fourth average pixel value of the second pixel column;

determining that content of the first image is associated with content of the third image in a vertical orientation; and displaying at least portions of the first image and the third image simultaneously.

5. A computer-implemented method, comprising:

receiving, by a device, an electronic publication including a first page and a second page following the first page;

identifying first image data in the electronic publication that corresponds to the first page of the electronic publication;

identifying second image data in the electronic publication that corresponds to the second page of the electronic publication;

determining a first portion of the first image data associated with a first border of the first image data, the first portion comprising a first plurality of pixels;

determining a second portion of the second image data associated with a second border of the second image data, the second portion comprising a second plurality of pixels;

determining a first comparison score based at least in part on the first plurality of pixels and the second plurality of pixels;

determining that the first comparison score is above a threshold;

determining that content of the first image data is associated with content of the second image data, wherein the first border is adjacent to the second border; and displaying at least portions of the first image data and the second image data simultaneously on a display of the device.

6. The computer-implemented method of claim 5, further comprising:

determining a third portion of the first image data associated with the first border of the first image data, the third portion including the first portion and comprising a third plurality of pixels;

determining a fourth portion of the second image data associated with the second border of the second image data, the fourth portion including the second portion and comprising a fourth plurality of pixels;

determining a second comparison score based at least in part on the third plurality of pixels and the fourth plurality of pixels; and determining that the second comparison score is above a threshold.

7. The computer-implemented method of claim 5, further comprising:

identifying third image data that corresponds to a third page of the electronic publication;

determining a third portion of the second image data associated with a third border of the second image data, the third portion comprising a third plurality of pixels;

determining a fourth portion of the third image data associated with a fourth border of the third image data, the fourth portion comprising a fourth plurality of pixels;

determining a second comparison score based at least in part on the third plurality of pixels and the fourth plurality of pixels;

determining that the second comparison score is above a threshold; and determining that content of the first image data is associated with content of the second image data and content of the third image data.

8. The computer-implemented method of claim 7, wherein the determining that content of the first image data is associated with content of the second image data and content of the third image data further comprises:

determining that the second border and the third border are substantially parallel; and determining that the first image data, the second image data and the third image data extend in a first direction.

9. The computer-implemented method of claim 5, wherein the first plurality of pixels and the second plurality of pixels are columns of pixels, and determining the first comparison score further comprises:

comparing a first average pixel value of a first pixel row of the first plurality of pixels to a second average pixel value of a second pixel row of the second plurality of pixels, wherein the first pixel row is a first number of pixels from a beginning of the first plurality of pixels and the second pixel row is the first number of pixels from a beginning of the second plurality of pixels.

10. The computer-implemented method of claim 5, further comprising:

determining, prior to determining the first portion, a third portion of the first image data associated with a third border of the first image data, the third portion comprising a third plurality of pixels;

determining a fourth portion of the second image data associated with a fourth border of the second image data, the fourth portion comprising a fourth plurality of pixels;

determining a second comparison score based at least in part on the third plurality of pixels and the fourth plurality of pixels;

determining that the second comparison score is not above the threshold; and determining that content of the first image data is not associated with content of the second image data, such that the third border is not adjacent to the fourth border.

11. The computer-implemented method of claim 5, wherein determining the first comparison score further comprises:

selecting a first group of pixels from the first plurality of pixels based on pixel values, each pixel within the first group having a pixel value within a first range of pixel values;

selecting a second group of pixels from the second plurality of pixels based on pixel values, each pixel within the second group having a pixel value within the first range of pixel values;

detecting first edges of the first group;

detecting second edges of the second group; and determining that the first edges and the second edges are aligned.

12. The computer-implemented method of claim 5, further comprising:

determining a first number of pixels from a first top of the first image data and the first portion;

determining a second number of pixels from a second top of the second image data and the second portion;

determining an offset between the first number of pixels and the second number of pixels; and aligning the first image with the second image using the offset.

13. The computer-implemented method of claim 5, wherein the electronic publication includes a plurality of sequential pages, the plurality of sequential pages including the first page and the second page, and the method further comprises:

receiving a command to display at least the first page on the display;

displaying, in response to the command to display at least the first page, at least portions of the first image data and the second image data simultaneously on the display of the device.

14. A computing device, comprising:

at least one processor;

a display; and a memory device including instructions operable to be executed by the at least one processor to cause the device to:

receive an electronic publication including a first page followed by a second page;

identify first image data in the electronic publication that corresponds to the first page of the electronic publication;

identify second image data in the electronic publication that corresponds to the second page of the electronic publication;

determine a first portion of the first image data associated with a first border of the first image data, the first portion comprising a first plurality of pixels;

determine a second portion of the second image data associated with a second border of the second image data, the second portion comprising a second plurality of pixels;

determine a first comparison score based at least in part on the first plurality of pixels and the second plurality of pixels;

determine that the first comparison score is above a threshold;

determine that content of the first image data is associated with content of the second image data, wherein the first border is adjacent to the second border; and display at least portions of the first image data and the second image data simultaneously on the display.

15. The device of claim 14, wherein the instructions further configure the system to:

determine a third portion of the first image data associated with the first border of the first image data, the third portion including the first portion and comprising a third plurality of pixels;

determine a fourth portion of the second image data associated with the second border of the second image data, the fourth portion including the second portion and comprising a fourth plurality of pixels;

determine a second comparison score based at least in part on the third plurality of pixels and the fourth plurality of pixels; and determine that the second comparison score is above a threshold.

16. The device of claim 14, wherein the instructions further configure the system to:

identify third image data that corresponds to a third page of the electronic publication;

determine a third portion of the second image data associated with a third border of the second image data, the third portion comprising a third plurality of pixels;

determine a fourth portion of the third image data associated with a fourth border of the third image data, the fourth portion comprising a fourth plurality of pixels;

determine a second comparison score based at least in part on the third plurality of pixels and the fourth plurality of pixels;

determine that the second comparison score is above a threshold; and determine that content of the first image data is associated with content of the second image data and content of the third image data.

17. The device of claim 16, wherein the instructions further configure the system to:

determine that the second border and the third border are substantially parallel; and determine that the first image data, the second image data and the third image data extend in a first direction.

18. The device of claim 14, wherein the first plurality of pixels and the second plurality of pixels are columns of pixels, and wherein the instructions further configure the system to:

compare a first average pixel value of a first pixel row of the first plurality of pixels to a second average pixel value of a second pixel row of the second plurality of pixels, wherein the first pixel row is a first number of pixels from a beginning of the first plurality of pixels and the second pixel row is the first number of pixels from a beginning of the second plurality of pixels.

19. The device of claim 14, wherein the instructions further configure the system to:

determine, prior to determining the first portion, a third portion of the first image data associated with a third border of the first image data, the third portion comprising a third plurality of pixels;

determine a fourth portion of the second image data associated with a fourth border of the second image data, the fourth portion comprising a fourth plurality of pixels;

determine a second comparison score based at least in part on the third plurality of pixels and the fourth plurality of pixels;

determine that the second comparison score is not above the threshold; and determine that content of the first image data is not associated with content of the second image data, such that the third border is not adjacent to the fourth border.

20. The device of claim 14, wherein the instructions further configure the system to:

select a first group of pixels from the first plurality of pixels based on pixel values, each pixel within the first group having a pixel value within a first range of pixel values;

select a second group of pixels from the second plurality of pixels based on pixel values, each pixel within the second group having a pixel value within the first range of pixel values;

detect first edges of the first group;

detect second edges of the second group; and determine that the first edges and the second edges are aligned.

21. The device of claim 14, wherein the instructions further configure the system to:
- determine a first number of pixels from a first top of the first image data and the first portion;
- determine a second number of pixels from a second top of the second image data and the second portion;
- determine an offset between the first number of pixels and the second number of pixels; and
- align the first image with the second image using the offset.

* * * * *